United States Patent
Jones et al.

(10) Patent No.: US 10,129,282 B2
(45) Date of Patent: Nov. 13, 2018

(54) ANOMALOUS NETWORK MONITORING, USER BEHAVIOR DETECTION AND DATABASE SYSTEM

(71) Applicant: PALANTIR TECHNOLOGIES INC., Palo Alto, CA (US)

(72) Inventors: Samuel Jones, New York, NY (US); Timothy Yousaf, New York, NY (US); Drew Dennison, Palo Alto, CA (US); Vivek Lakshmanan, Seattle, WA (US); Joseph Staehle, New York, NY (US); Samuel Kremin, McLean, VA (US); Maxim Kesin, Woodmere, NY (US); Taylor Heroux, Brooklyn, NY (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 15/395,483

(22) Filed: Dec. 30, 2016

(65) Prior Publication Data
US 2017/0111381 A1    Apr. 20, 2017

Related U.S. Application Data

(63) Continuation of application No. 14/982,699, filed on Dec. 29, 2015, now Pat. No. 9,537,880.
(Continued)

(51) Int. Cl.
*H04L 29/06*    (2006.01)
*G06F 21/00*    (2013.01)
*H04L 29/08*    (2006.01)

(52) U.S. Cl.
CPC ........ *H04L 63/1425* (2013.01); *H04L 67/306* (2013.01)

(58) Field of Classification Search
CPC .......................... H04L 63/1425; H04L 67/306
(Continued)

(56) References Cited

U.S. PATENT DOCUMENTS 5,978,475 A    11/1999 Schneier et al.
6,253,203 B1    6/2001 O'Flaherty et al.
(Continued)

FOREIGN PATENT DOCUMENTS

CN    101729531    6/2010
CN    103281301    9/2013
(Continued)

OTHER PUBLICATIONS

Baker et al., "The Development of a Common Enumeration of Vulnerabilities and Exposures," Presented at the Second International Workshop on Recent Advances in Intrusion Detection, Sep. 7-9, 1999, pp. 35.
(Continued)

*Primary Examiner* — Morshed Mehedi
*Assistant Examiner* — Abdullah Almamun
(74) *Attorney, Agent, or Firm* — Knobbe Martens Olson & Bear LLP

(57) ABSTRACT

Methods, systems, and apparatus, including computer programs encoded on computer storage media, for network monitoring, user account compromise determination, and user behavior database system. The system monitors network actions of user accounts including user account access across multitudes of network accessible systems, determines user account transitions, and determines different types of high-risk user behavior indicative of compromise. Network actions can be obtained from generated information by the network accessible systems, and correlated across additional data sets including contextual ones. User interfaces are generated describing network actions of user accounts, and
(Continued)

are configured for user interaction, which cause generation of updated user interfaces and access to electronic data sources to determine information relevant to the user interaction.

20 Claims, 12 Drawing Sheets

Related U.S. Application Data

(60) Provisional application No. 62/207,272, filed on Aug. 19, 2015.

(58) Field of Classification Search
USPC .............................. 726/25; 705/51; 713/189
See application file for complete search history.

(56) References Cited

U.S. PATENT DOCUMENTS

| | | |
|---|---|---|
| 6,725,240 B1 | 4/2004 | Asad et al. |
| 6,807,569 B1 | 10/2004 | Bhimani et al. |
| 7,013,395 B1 | 3/2006 | Swiler et al. |
| 7,017,046 B2 | 3/2006 | Doyle et al. |
| 7,069,586 B1 | 6/2006 | Winneg et al. |
| 7,225,468 B2 | 5/2007 | Waisman et al. |
| 7,287,689 B2 | 10/2007 | Tidwell et al. |
| 7,472,421 B2 | 12/2008 | Cummins |
| 7,596,285 B2 | 9/2009 | Brown et al. |
| 7,770,032 B2 | 8/2010 | Nesta et al. |
| 7,801,871 B2 | 9/2010 | Gosnell |
| 7,962,495 B2 | 6/2011 | Jain et al. |
| 8,181,253 B1 * | 5/2012 | Zaitsev .................. G06F 21/552 713/152 |
| 8,190,893 B2 | 5/2012 | Benson et al. |
| 8,196,184 B2 | 6/2012 | Amirov et al. |
| 8,239,668 B1 | 8/2012 | Chen et al. |
| 8,295,898 B2 | 10/2012 | Ashfield et al. |
| 8,301,904 B1 | 10/2012 | Gryaznov |
| 8,312,546 B2 | 11/2012 | Alme |
| 8,321,958 B1 | 11/2012 | Fleming et al. |
| 8,434,150 B2 | 4/2013 | Xie et al. |
| 8,448,247 B2 | 5/2013 | Stute |
| 8,533,319 B2 | 9/2013 | Draugelis |
| 8,615,605 B2 | 12/2013 | Yu et al. |
| 8,646,080 B2 | 2/2014 | Williamson et al. |
| 8,683,322 B1 | 3/2014 | Cooper |
| 8,726,379 B1 | 5/2014 | Stiansen et al. |
| 8,769,412 B2 * | 7/2014 | Gill ........................ G06F 21/55 702/185 |
| 8,782,794 B2 | 7/2014 | Ramcharran |
| 8,789,140 B2 | 7/2014 | Williams et al. |
| 8,881,288 B1 | 11/2014 | Levy et al. |
| 8,904,506 B1 | 12/2014 | Canavor et al. |
| 8,931,043 B2 * | 1/2015 | Cooper .................. H04L 63/10 709/224 |
| 9,009,827 B1 | 4/2015 | Albertson et al. |
| 9,021,260 B1 | 4/2015 | Falk et al. |
| 9,049,117 B1 | 6/2015 | Nucci et al. |
| 9,100,428 B1 | 8/2015 | Visbal |
| 9,319,419 B2 | 4/2016 | Sprague et al. |
| 9,335,897 B2 | 5/2016 | Goldenberg |
| 9,338,013 B2 | 5/2016 | Castellucci et al. |
| 9,401,925 B1 | 7/2016 | Guo et al. |
| 9,407,652 B1 | 8/2016 | Kesin et al. |
| 9,419,992 B2 | 8/2016 | Ricafort et al. |
| 9,537,880 B1 | 1/2017 | Jones et al. |
| 9,576,119 B2 | 2/2017 | McGeehan et al. |
| 9,628,500 B1 | 4/2017 | Kesin et al. |
| 9,930,055 B2 | 3/2018 | Ricafort et al. |
| 2002/0112157 A1 | 8/2002 | Doyle et al. |
| 2004/0123139 A1 | 6/2004 | Aiello et al. |
| 2004/0153418 A1 | 8/2004 | Hanweck |
| 2004/0250124 A1 | 12/2004 | Chesla et al. |
| 2005/0125295 A1 | 6/2005 | Tidwell et al. |
| 2005/0157662 A1 * | 7/2005 | Bingham ............ H04L 63/1425 370/254 |
| 2005/0229256 A2 | 10/2005 | Banzhof |
| 2005/0262556 A1 | 11/2005 | Waisman et al. |
| 2005/0275638 A1 | 12/2005 | Kolmykov-Zotov et al. |
| 2006/0021049 A1 | 1/2006 | Cook |
| 2006/0031928 A1 | 2/2006 | Conley et al. |
| 2006/0069912 A1 | 3/2006 | Zheng et al. |
| 2006/0156407 A1 | 7/2006 | Cummins |
| 2006/0179003 A1 | 8/2006 | Steele et al. |
| 2006/0212931 A1 | 9/2006 | Shull et al. |
| 2006/0218637 A1 | 9/2006 | Thomas et al. |
| 2006/0265324 A1 | 11/2006 | Leclerc et al. |
| 2006/0265747 A1 | 11/2006 | Judge |
| 2006/0265751 A1 | 11/2006 | Cosquer et al. |
| 2007/0067846 A1 | 3/2007 | McFarlane et al. |
| 2007/0143851 A1 | 6/2007 | Nicodemus |
| 2007/0214115 A1 | 9/2007 | Liu et al. |
| 2007/0294766 A1 | 12/2007 | Mir et al. |
| 2008/0005555 A1 | 1/2008 | Lotem et al. |
| 2008/0082380 A1 | 4/2008 | Stephenson |
| 2008/0104407 A1 | 5/2008 | Horne et al. |
| 2008/0201580 A1 | 8/2008 | Savitzky et al. |
| 2008/0222706 A1 * | 9/2008 | Renaud ............... H04L 63/1408 726/4 |
| 2008/0229422 A1 | 9/2008 | Hudis et al. |
| 2009/0103442 A1 | 4/2009 | Douville |
| 2009/0228701 A1 | 9/2009 | Lin |
| 2009/0292743 A1 | 11/2009 | Bigus et al. |
| 2009/0328222 A1 | 12/2009 | Helman et al. |
| 2010/0024017 A1 | 1/2010 | Ashfield et al. |
| 2010/0077481 A1 | 3/2010 | Polyakov et al. |
| 2010/0100963 A1 | 4/2010 | Mahaffey |
| 2010/0179831 A1 | 7/2010 | Brown et al. |
| 2010/0235915 A1 | 9/2010 | Memon et al. |
| 2010/0262688 A1 | 10/2010 | Hussain et al. |
| 2010/0330801 A1 | 12/2010 | Rouh |
| 2011/0060910 A1 | 3/2011 | Gormish et al. |
| 2011/0202555 A1 | 8/2011 | Cordover et al. |
| 2011/0219450 A1 | 9/2011 | McDougal et al. |
| 2011/0288660 A1 | 11/2011 | Wojsznis et al. |
| 2011/0295982 A1 | 12/2011 | Misra |
| 2011/0296003 A1 | 12/2011 | McCann et al. |
| 2012/0079592 A1 | 3/2012 | Pandrangi |
| 2012/0084866 A1 * | 4/2012 | Stolfo .................. G06F 21/554 726/25 |
| 2012/0110633 A1 | 5/2012 | An et al. |
| 2012/0110674 A1 | 5/2012 | Belani et al. |
| 2012/0169593 A1 | 7/2012 | Mak et al. |
| 2012/0185419 A1 * | 7/2012 | Kuhn ................ H04M 1/72569 706/12 |
| 2012/0198489 A1 * | 8/2012 | O'Connell ............ G06Q 30/06 725/14 |
| 2012/0218305 A1 | 8/2012 | Patterson et al. |
| 2012/0254129 A1 | 10/2012 | Wheeler et al. |
| 2012/0266245 A1 | 10/2012 | McDougal et al. |
| 2012/0284791 A1 | 11/2012 | Miller et al. |
| 2012/0304244 A1 | 11/2012 | Xie et al. |
| 2012/0323829 A1 | 12/2012 | Stokes et al. |
| 2012/0330801 A1 | 12/2012 | McDougal et al. |
| 2013/0019306 A1 | 1/2013 | Lagar-Cavilla et al. |
| 2013/0097709 A1 | 4/2013 | Basavapatna et al. |
| 2013/0110876 A1 | 5/2013 | Meijer et al. |
| 2013/0139268 A1 | 5/2013 | An et al. |
| 2013/0239217 A1 * | 9/2013 | Kindler ............. G06F 17/30958 726/25 |
| 2013/0254833 A1 | 9/2013 | Nicodemus et al. |
| 2013/0254885 A1 | 9/2013 | Devost |
| 2013/0275416 A1 * | 10/2013 | Thomson ......... G06Q 10/06393 707/723 |
| 2014/0013451 A1 | 1/2014 | Kulka et al. |
| 2014/0053265 A1 * | 2/2014 | Crowley ................ H04L 43/12 726/22 |
| 2014/0059683 A1 | 2/2014 | Ashley |
| 2014/0082691 A1 | 3/2014 | Warn et al. |
| 2014/0123279 A1 | 5/2014 | Bishop et al. |
| 2014/0143009 A1 | 5/2014 | Brice et al. |
| 2014/0173712 A1 | 6/2014 | Ferdinand |

(56) References Cited

U.S. PATENT DOCUMENTS

| | | | | |
|---|---|---|---|---|
| 2014/0173738 | A1* | 6/2014 | Condry | G06F 21/568 726/25 |
| 2014/0181968 | A1 | 6/2014 | Ge et al. | |
| 2014/0188895 | A1 | 7/2014 | Wang et al. | |
| 2014/0201345 | A1* | 7/2014 | Abuelsaad | H04L 41/5067 709/223 |
| 2014/0229422 | A1 | 8/2014 | Jain et al. | |
| 2014/0279684 | A1 | 9/2014 | Liao et al. | |
| 2014/0283107 | A1 | 9/2014 | Walton et al. | |
| 2014/0366132 | A1 | 12/2014 | Stiansen et al. | |
| 2015/0039565 | A1 | 2/2015 | Lucas | |
| 2015/0089568 | A1 | 3/2015 | Sprague et al. | |
| 2015/0128274 | A1 | 5/2015 | Giokas | |
| 2015/0188715 | A1 | 7/2015 | Castelluci et al. | |
| 2015/0229664 | A1* | 8/2015 | Hawthorn | H04L 63/1408 726/25 |
| 2015/0235152 | A1 | 8/2015 | Eldardiry et al. | |
| 2015/0248563 | A1 | 9/2015 | Alfarano et al. | |
| 2015/0261847 | A1 | 9/2015 | Ducott et al. | |
| 2015/0326601 | A1* | 11/2015 | Grondin | G06Q 10/0635 726/25 |
| 2016/0004864 | A1 | 1/2016 | Falk et al. | |
| 2016/0028759 | A1 | 1/2016 | Visbal | |
| 2016/0050224 | A1 | 2/2016 | Ricafort et al. | |
| 2016/0191532 | A1 | 6/2016 | Seiver et al. | |
| 2017/0003352 | A1 | 1/2017 | Barre et al. | |
| 2017/0099311 | A1 | 4/2017 | Kesin et al. | |
| 2017/0195354 | A1 | 7/2017 | Kesin et al. | |
| 2018/0159874 | A1 | 6/2018 | Ricafort et al. | |

FOREIGN PATENT DOCUMENTS

| | | |
|---|---|---|
| EP | 1589716 | 10/2005 |
| EP | 1962222 | 8/2008 |
| EP | 2284769 | 2/2011 |
| EP | 2892197 | 7/2015 |
| EP | 2897051 | 7/2015 |
| EP | 2963578 | 1/2016 |
| EP | 2985974 | 2/2016 |
| EP | 3110104 | 12/2016 |
| EP | 3133522 | 2/2017 |
| NL | 2011642 | 8/2015 |
| WO | WO 2005/010685 | 2/2005 |

OTHER PUBLICATIONS

Bhuyan et al., "Network Anomaly Detection: Methods, Systems and Tools," First Quarter 2014, IEEE, in 34 pages.

Crosby et al., "Efficient Data Structures for Tamper-Evident Logging," Department of Computer Science, Rice University, 2009, pp. 17.

FireEye—Products and Solutions Overview, <http://www.fireeye.com/products-and-solutions> Printed Jun. 30, 2014 in 3 pages.

FireEye, <http://www.fireeye.com/> Printed Jun. 30, 2014 in 2 pages.

Glaab et al., "EnrichNet: Network-Based Gene Set Enrichment Analysis," Bioinformatics 28.18 (2012): pp. i451-i457.

Huang et al., "Systematic and Integrative Analysis of Large Gene Lists Using DAVID Bioinformatics Resources," Nature Protocols, 4.1, 2008, 44-57.

Hur et al., "SciMiner: web-based literature mining tool for target identification and functional enrichment analysis," Bioinformatics 25.6 (2009): pp. 838-840.

Lee et al., "A Data Mining and CIDF Based Approach for Detecting Novel and Distributed Intrusions," Lecture Notes in Computer Science, vol. 1907 Nov. 11, 2000, pp. 49-65.

Ma et al., "A New Approach to Secure Logging," ACM Transactions on Storage, vol. 5, No. 1, Article 2, Published Mar. 2009, 21 pages.

Schneier et al., "Automatic Event Stream Notarization Using Digital Signatures," Security Protocols, International Workshop Apr. 1996 Proceedings, Springer-Veriag, 1997, pp. 155-169, https://schneier.com/paper-event-stream.pdf.

Schneier et al., "Cryptographic Support for Secure Logs on Untrusted Machines," The Seventh USENIX Security Symposium Proceedings, USENIX Press, Jan. 1998, pp. 53-62, https://www.schneier.com/paper-secure-logs.pdf.

VirusTotal—About, <http://www.virustotal.com/en/about/> Printed Jun. 30, 2014 in 8 pages.

Waters et al., "Building an Encrypted and Searchable Audit Log," Published Jan. 9, 2004, 11 pages, http://www.parc.com/content/attachments/building_encrypted_searchable_5059_parc.pdf.

Zheng et al., "GOEAST: a web-based software toolkit for Gene Ontology enrichment analysis," Nucleic acids research 36.suppl 2 (2008): pp. W385-W363.

Notice of Allowance for U.S. Appl. No. 14/033,076 dated Mar. 11, 2016.

Notice of Allowance for U.S. Appl. No. 14/223,918 dated Jan. 6, 2016.

Notice of Allowance for U.S. Appl. No. 14/280,490 dated Nov. 26, 2014.

Notice of Allowance for U.S. Appl. No. 14/473,860 dated Feb. 27, 2015.

Notice of Allowance for U.S. Appl. No. 14/473,860 dated Jan. 5, 2015.

Notice of Allowance for U.S. Appl. No. 14/479,863 dated Mar. 31, 2015.

Notice of Allowance for U.S. Appl. No. 14/823,935 dated Apr. 25, 2016.

Notice of Allowance for U.S. Appl. No. 14/970,317 dated May 26, 2016.

Official Communication for European Patent Application No. 14199180.2 dated Jun. 22, 2015.

Official Communication for European Patent Application No. 14199180.2 dated Aug. 31, 2015.

Official Communication for European Patent Application No. 15175106.2 dated Nov. 5, 2015.

Official Communication for European Patent Application No. 15180985.2 dated Jan. 15, 2016.

Official Communication for U.S. Appl. No. 14/033,076 dated Aug. 13, 2015.

Official Communication for U.S. Appl. No. 14/033,076 dated Nov. 6, 2015.

Official Communication for U.S. Appl. No. 14/223,918 dated Jun. 8, 2015.

Official Communication for U.S. Appl. No. 14/280,490 dated Jul. 24, 2014.

Official Communication for U.S. Appl. No. 14/473,860 dated Nov. 4, 2014.

Official Communication for U.S. Appl. No. 14/479,863 dated Dec. 26, 2014.

Official Communication for U.S. Appl. No. 14/490,612 dated Aug. 18, 2015.

Official Communication for U.S. Appl. No. 14/490,612 dated Jan. 27, 2015.

Official Communication for U.S. Appl. No. 14/490,612 dated Mar. 31, 2015.

Official Communication for U.S. Appl. No. 14/731,312 dated Apr. 14, 2016.

Official Communication for U.S. Appl. No. 14/816,748 dated Apr. 1, 2016.

Official Communication for U.S. Appl. No. 14/816,748 dated May 24, 2016.

Official Communication for U.S. Appl. No. 14/823,935 dated Dec. 4, 2015.

Official Communication for U.S. Appl. No. 14/923,712 dated Feb. 12, 2016.

Official Communication for U.S. Appl. No. 14/923,712 dated Jun. 17, 2016.

Official Communication for U.S. Appl. No. 14/970,317 dated Mar. 21, 2016.

Official Communication for U.S. Appl. No. 15/071,064 dated Jun. 16, 2016.

(56) References Cited

OTHER PUBLICATIONS

Notice of Allowance for U.S. Appl. No. 14/982,699 dated Oct. 7, 2016.
Notice of Allowance for U.S. Appl. No. 15/224,443 dated Dec. 19, 2016.
Official Communication for U.S. Appl. No. 14/982,699 dated Mar. 25, 2016.
Official Communication for U.S. Appl. No. 14/982,699 dated Aug. 26, 2016.
Official Communication for U.S. Appl. No. 15/207,343 dated Nov. 23, 2016.
Official Communication for European Patent Application No. 15180985.2 dated Mar. 30, 2017.
Official Communication for European Patent Application No. 16176273.7 dated Oct. 21, 2016.
Official Communication for European Patent Application No. 16184823.9 dated Nov. 24, 2016.
Official Communication for U.S. Appl. No. 15/207,343 dated May 17, 2017.
Official Communication for U.S. Appl. No. 15/228,297 dated Jun. 30, 2017.
Official Communication for U.S. Appl. No. 15/462,540 dated Jul. 5, 2017.
Official Communication for European Patent Application No. 16184823.9 dated May 23, 2018.
Official Communication for European Patent Application No. 18161005.6 dated Apr. 11, 2018.
Notice of Allowance for U.S. Appl. No. 15/228,297 dated Nov. 24, 2017.
Notice of Allowance for U.S. Appl. No. 15/207,343 dated Apr. 3, 2018.
Notice of Allowance for U.S. Appl. No. 15/462,540 dated May 10, 2018.
Official Communication for European Patent Application No. 17155145.0 dated Aug. 31, 2017.
Official Communication for U.S. Appl. No. 15/207,343 dated Sep. 27, 2017.
Official Communication for U.S. Appl. No. 15/462,540 dated Oct. 13, 2017.
Official Communication for U.S. Appl. No. 15/838,658 dated Mar. 8, 2018.

* cited by examiner

FIG. 6

Investigations for RLP8: RLP8 | 30 MARCH, 2015 ☒ THRU 3 APRIL, 2015 ☒ — 606

INVESTIGATIONS FOR RLP8: 1 (0 OPEN) — 602

QUICK TRIAGE: DISABLED WHILE VIEWING "INVESTIGATION HISTORY"

[ RED ] [ YELLOW ] [ GREEN ] [ VIEW INVESTIGATIONS ]

INVESTIGATION HISTORY | ACTIVE DIRECTORY | REMOTE ACCESS | USER CHAINING — 604

ALL INVESTIGATIONS FOR RLP8: — 608

[ EXPLORE ] [ DELETE INVESTIGATION ] [ CREATE INVESTIGATION ]

| STRATEGY | START_DATE | END_DATE | SUBMITTER | ASSIGNED_TO | STATUS | JUDGEMENT | LAST_MODIFIED |
|---|---|---|---|---|---|---|---|
| ☑ REMOTE ACCESS | 2015-04-02 | 2015-04-04 | USER | | CLOSED | RED | 2015-04-30 02:14:55 |

SELECTED CASE HISTORY: — 610

| SUBMITTED_BY | ACTION | DESCRIPTION | TIMESTAMP |
|---|---|---|---|
| REVIEWING USERS | STATUS CHANGE | FROM 'OPEN' TO 'CLOSED' | 2015-06-30 02:16:55 |
| | COMMENT | CONNECTION ON 4/3 FROM TX THEN R WITHIN 5 MINUTES FROM 2 SEPARATE HOSTS SUGGEST CRED-SHARING | 2015-06-24 02:38:24 |
| | JUDGEMENT | MARKED AS "RED" | 2015-06-24 02:38:23 |
| | ASSIGNMENT | ASSIGNED TO EMPLOYEE 1 | 2015-06-23 03:57:58 |

[ RED ▾ ] [ MAKE JUDGEMENT ]

[ CLOSED ▾ ] [ CHANGE STATUS ]

[ ▾ ] [ ASSIGN TO ]

NEW COMMENT...

FIG. 7

| RLP8 | | | |
|---|---|---|---|
| INVESTIGATIONS FOR RLP8: 1 (0 OPEN) | 📅 30 MARCH, 2015 ✖ THRU 📅 3 APRIL, 2015 ✖ | | |
| | QUICK TRIAGE: CREATE NEW REMOTE ACCESS INVESTIGATION WITH FOLLOWING JUDGEMENT | | |
| | RED | YELLOW | GREEN |

| INVESTIGATION HISTORY | ACTIVE DIRECTORY — 702 | REMOTE ACCESS | USER CHAINING | VIEW INVESTIGATIONS |

ACTIVE DIRECTORY ACCOUNT

ACCOUNT: USER  ⎫
NAME: NAME      ⎬ — 704
TITLE: CONTRACTOR ⎭
TYPE:           — 706
DIVISION: 9090
DEPT: 753 - IT HR SYSTEMS
USER
ACCOUNT         — 708
CONTROL: 512 - ENABLED ACCOUNT
E-MAIL: E-MAIL ADDRESS
MANAGER: MANAGER  ⎫
ACCOUNTS: ACCOUNTS ⎬ — 710

| GROUP MEMBERSHIPS | — 712 |
|---|---|
| Group Membership 1 | |
| Group Membership 2 | |
| Group Membership 3 | |
| Group Membership 4 | |
| Group Membership 5 | |
| Group Membership 6 | |
| Group Membership 7 | |

ANOMALOUS NETWORK MONITORING, USER BEHAVIOR DETECTION AND DATABASE SYSTEM

RELATED APPLICATIONS

The present disclosure is a continuation of, and claims priority to, U.S. patent application Ser. No. 14/982,699. The present disclosure further references various features of, and claims priority to, U.S. Provisional Pat. App. No. 62/207,272. The entire disclosure of these applications are hereby made part of this specification as if set forth fully herein and incorporated by reference for all purposes, for all that it contains. Any and all applications for which a foreign or domestic priority claim is identified in the Application Data Sheet as filed with the present application are hereby incorporated by reference in their entirety under 37 CFR 1.57.

BACKGROUND

Large businesses (e.g., national or international corporations) often rely on networked computer systems to transfer and relay information between employees, and between employees and customers. This information, in many cases, can be sensitive and include personal information regarding employees or consumers (e.g., credit card information, addresses, and so on). To protect this sensitive information (e.g., from a malicious actor), businesses can provide access to the sensitive information solely to specific employees that have a business purpose which necessitates access. Additionally, businesses can encrypt the information, include network security hardware such as firewalls, and limit locations the sensitive information is stored.

SUMMARY

Modern day networks used by a business can include tens, or even hundreds, of thousands of user accounts, each accessing an untold number of laptops, servers, domain controllers, from disparate locations all around the world. This degree of complication creates a growing technical problem regarding maintaining the sanctity of private information stored by the business. Without a system to monitor network interactions across huge amounts of network accessible systems, and determine whether user accounts are behaving suspiciously, such a technically complicated network is open by a malicious actor to gain access to user accounts.

Networks can utilize private user account log-in information, and designate only particular user accounts as having access rights to important network accessible systems. However, this technical solution fails once a malicious actor gains log-in information to a user account. In this case, the malicious actor is free to access network accessible systems, and obtain sensitive information. Therefore, to overcome this technical problem, techniques described in this specification can determine whether specific network actions taken by user accounts indicate that the user account is compromised, allowing deep insights into the nature and behavior of user accounts, providing an extra layer of network security. Indeed, techniques described in this specification can detect high-risk behavior that looks like (e.g., appears to be analogous or similar to) behavior that would be utilized by an attacker, allowing a reviewing user to identify attackers through the high-risk behavior that might be exhibited. In this way, high-risk behavior can be identified and stopped (e.g., through network policies or technical actions), lowering the risk surface of the network and making it harder for an attacker to compromise the network.

Particular embodiments of the subject matter described in this specification can be implemented so as to realize one or more of the following advantages. A system can quickly identify user accounts that are potentially compromised for review by a user (e.g., a system administrator, a security officer, and so on.) The system can flag user accounts by determining whether actions the user accounts have taken on a network are indicative of the user accounts being compromised. The reviewing user can view information (e.g., on a user device) describing the flagged user accounts and specific actions each user account has taken, and determine whether any of the user accounts are compromised. In this way, the reviewing user can have insights into networks that include a large number of user accounts (10,000+; 100,000+ user accounts), by visually examining information describing user accounts determined by the system to need reviewing. Thus, the system can guard against a malicious actor obtaining access to a user account (e.g., a privileged user account) and obtaining sensitive information, or otherwise harming the network.

It has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The present disclosure describes various embodiments of interactive and dynamic user interfaces that are the result of significant development. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interface via the inputs described herein may provide an optimized display of, and interaction with, graph data, image data, and/or other data, and may enable a user to more quickly and accurately access, navigate, assess, and digest the data than previous systems.

Further, the interactive and dynamic user interfaces described herein are enabled by innovations in efficient interactions between the user interfaces and underlying systems and components. For example, disclosed herein are improved methods of receiving user inputs (including methods of interacting with, and selecting, images, graphs, and other types of data), translation and delivery of those inputs to various system components, automatic and dynamic execution of complex processes in response to the input delivery, automatic interaction among various components and processes of the system, and automatic and dynamic updating of the user interfaces (to, for example, display the relevant data from various different applications and/or data sources). The interactions and presentation of data via the interactive user interfaces described herein may accordingly provide cognitive and ergonomic efficiencies and advantages over previous systems.

Various embodiments of the present disclosure provide improvements to various technologies and technological fields. For example, existing data aggregation and analysis technology is limited in various ways (e.g., limited in the types of applications or data sources the data may be drawn from, loss of data interactivity, etc.), and various embodiments of the disclosure provide significant improvements over such technology. Additionally, various embodiments of the present disclosure are inextricably tied to computer technology. In particular, various embodiments rely on detection of user inputs via graphical user interfaces, aggregation of data from different applications and data sources, and automatic processing, formatting, and display of the aggregated data via interactive graphical user interfaces. Such features and others (e.g., automatically determining an application or data source an inputted link is directed to, accessing the application or data source to retrieve and display the requested data, implementing interactivity of displayed data reflective of how the data would be displayed in its native application) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

In general, one innovative aspect of the subject matter described in this specification can be embodied in methods that include the actions of obtaining data describing network actions of a plurality of user accounts associated with one or more networks; determining, using the obtained data, one or more user compromise scores for each of the user accounts, wherein each user compromise score measures a type of user behavior associated with a risk of compromise; determining, using the one or more user compromise scores for each user account, one or more user accounts of the plurality of user accounts to identify for review; and providing, for presentation, information describing the determined user accounts and respective associated user compromise scores.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 6 is an example user interface of an investigative history of a user account selected for review.

FIG. 7 illustrates an example user interface identifying user profile data of the selected user account.

FIG. 8 illustrates an example user interface describing remote access information associated with the selected user account.

Like reference numbers and designations in the various drawings indicate like elements.

DETAILED DESCRIPTION

Figure 1:
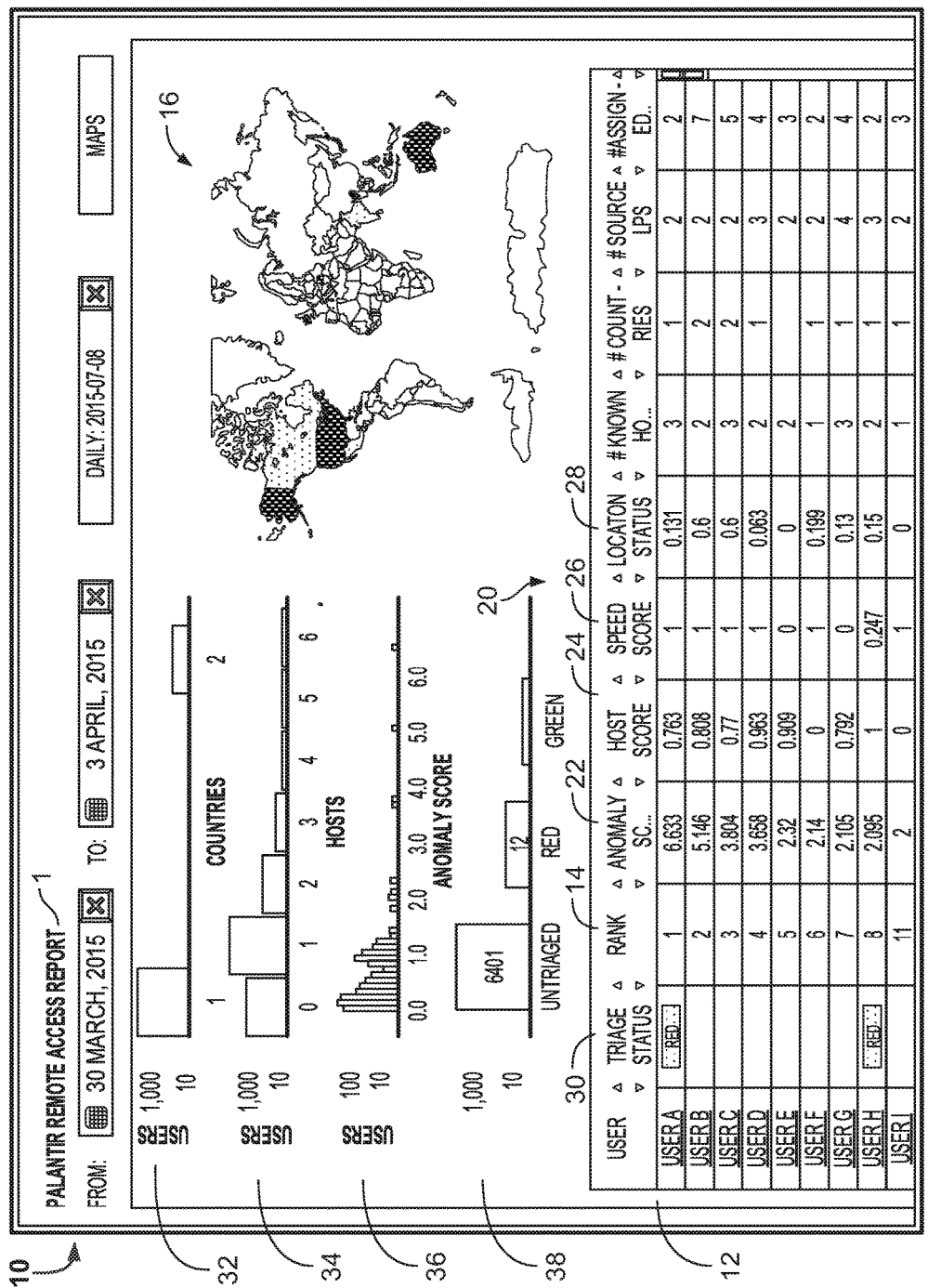
FIG. 1 illustrates an example user interface for user account compromise determination.

This specification describes a system (e.g., the user account compromise system described below) that can enable a reviewing user (e.g., a system administrator, a security officer) to quickly review user accounts, and network actions, determined by the system to be associated with a risk of being compromised. The system can obtain information describing network actions of user accounts associated with a business, and determine user compromise scores for each user account, with each score associated with a type of user behavior indicative, alone or in combination with other types of user behavior, of the user account being compromised (e.g., controlled by a malicious actor). As will be described below, the user compromise scores prioritize user accounts in need of monitoring, or that need to be examined in more detail, by the reviewing user. For instance, the reviewing user can quickly view the user compromise scores (e.g., the user compromise scores can be automatically presented in descending order) and prioritize user accounts to be examined. In this way, a small team is able to utilize the features described below to monitor thousands, tens of thousands or more, user accounts associated with one or more networks.

To determine each user compromise score, the system can compare user behavior of a user account to information describing average (e.g., a measure of central tendency of) user behavior of other user accounts associated with the business (e.g., a same employee role), which can be determined from one or more models maintained and updated by the system. Additionally, the system can obtain historical information associated with each user account (e.g., past user behavior of the user account), and compare the user behavior of each user account to its historical information. Thus, to determine each user compromise score for a particular user account, the system can utilize (e.g., combine or weight) user behavior of other user accounts (e.g., user accounts associated with a same employee role as the particular user account) and historical information of the particular user account and/or historical information of user accounts associated with a same employee role.

To determine user behavior, the system can obtain information describing network actions of user accounts. In this specification, network actions can include any action that affects a network accessible system, or user account, associated with one or more networks controlled by, or accessible to, the business, including accessing a network accessible system from a particular user device, creating a new user account, executing code on a network accessible system, accessing data on a network accessible system, escalating privileges of one or more user accounts, a user account switching to a different user account (e.g., a privileged account), and so on. The network actions can be obtained, and determined, from virtual private network (VPN) logs, Active Directory (AD) logs, firewall logs, user account access records, system logs including keystrokes pressed, mouse movements, touch inputs received, processes or code executed, user accounts that accessed or disconnected from the system, and so on. For instance, the VPN logs can identify internet protocol (IP) addresses of a connection request to a user account.

The system can determine user accounts to identify (e.g., flag) for review based on the determined user compromise scores. That is, the system can identify user accounts exhibiting one or more types of behavior indicative of the user account being compromised. The system can then provide user interfaces describing the identified user accounts (e.g., prioritized based on respective user compromise scores), which the reviewing user can quickly review and, at his/her discretion, request more detailed information about. In this way, the reviewing user can review a user account and determine whether the user account is compromised (e.g., determine a risk of compromise from the user compromise scores), and upon a positive determination, take appropriate actions to remedy the compromise.

In some implementations, when providing user interfaces to the reviewing user, the system can group user compromise scores according to the type of user behavior they describe (e.g., the system can provide selectable options to the reviewing user to receive user interfaces with grouped user compromise scores, or the reviewing user can select which user compromise scores he/she is interested in).

For instance, as described below in FIG. 1, the example user interface includes user compromise scores that measure user behavior associated with "Remote Access", which can be user behavior associated with initially accessing user accounts or network accessible systems. As an example, the user behavior can include the specific systems (e.g., user devices) used to access the network(s) and/or user accounts, the specific network accessible systems accessed, geographic locations from which user accounts were accessed, and so on.

In another instance, described below in FIG. 10, the example user interface includes user compromise scores that measure user behavior associated with "User Chaining", which can be user behavior after accessing user accounts. As an example for a particular user account, user behavior can include tracking the particular user account switching user accounts to a different user account (e.g., a privileged user account with administrator or escalated access privileges to network accessible systems or user accounts), processes (e.g., operating system processes) that the particular user account initiates, or otherwise executes, on network accessible systems, and so on.

FIG. 1 illustrates an example user interface 10 for user account compromise determination. The user interface 10 is an example of a user interface that can be presented on a user device (e.g., a laptop, a tablet, a computer, a wearable device) executing an application (e.g., a web browser), and can be received from a system (e.g., the user account compromise system 100) over a network (e.g., the Internet).

As illustrated in FIG. 1, the user interface 10 includes identifications of user accounts 20 that can access one or more network accessible systems of a business, and that are associated with a risk of being compromised (e.g., controlled by a malicious actor). Each user account includes an identification of user compromise scores 20, with each score measuring a type of user behavior indicative of the user account being compromised. In some implementations, the user compromise scores can be between a range of numbers (e.g., between zero and one), with a greater score indicating a greater risk of compromise. The user accounts 12 are ordered according to a rank 14 determined from a combination (e.g., a weighted combination) of the user compromise scores 20. In some implementations, the rank can be based solely off the "Anomaly Score", described below with reference to FIG. 4. In this way, user accounts can be prioritized for review (e.g., by a reviewing user such as a system administrator or member of a security team).

As described above, the example user interface 10 includes user compromise scores associated with "Remote Access" 1, and includes user compromise scores measuring types of user behavior when user accounts, or network accessible systems, are initially accessed.

For instance, the "Host Score" 24 for a particular user account (e.g., "RLP8") is a measure associated with network accessible systems (e.g., user devices, or other systems, such as computers, laptops, and so on) used by the particular user account to access a network of the business (e.g., access one or more network accessible systems, target hosts, and so on). The "Host Score" 24 can be based off a number of network accessible systems an average user account utilizes, and a number of network accessible systems the particular user account normally uses. Furthermore, the "Host Score" 24 can be based off types of network accessible systems the particular user account is normally associated with (e.g., laptops, tablets, and so on). In addition to a number of network accessible systems, the "Host Score" 24 can be greater if the particular user account has recently used network accessible systems not historically associated with the particular user account.

The "Speed Score" 24 for a particular user account measures how likely it is that a single person has used (e.g., provided log-in information associated with the particular user account) the particular user account from disparate locations in a period of time. For instance, if the particular user account was used in a first remote session from a first location (e.g., Austin, Tex.), and a short period of time later (e.g., 15 minutes), accessed from a second location (e.g., San Francisco, Calif.), the "Speed Score" 26 can indicate that one user could not travel fast enough between those two locations to effect the two remote sessions. This type of behavior could represent user account compromise or credential sharing (e.g., a person sharing credentials of a user account with another person not associated with the user account).

The "Location Score" 26 for a particular user account measures risk and unusualness associated with the locations from which the particular user account was used. For instance, a particular geographic region can be known (e.g., to a system administrator) to be associated with malicious activity. The "Location Score" 28 can thus be greater if the particular user account is being accessed from the particular geographic region. Additionally, the "Location Score" 28 can be greater if the particular user account is being accessed from geographic regions that the particular user account has not, or rarely, previously been used from.

The "Anomaly Score" 22 for a particular account is a combination of the "Host Score" 24, "Speed Score" 26, and "Location Score" 28 (e.g., a weighted sum). In some implementations, the "Anomaly Score" 28 is a convolution of the weighted sum taken over time with a user selectable window size. Determining an anomaly score is described below, with reference to FIG. 4.

The user interface 10 further includes a map 16 of the Earth, and countries from which remote sessions (e.g., VPN sessions) to access user accounts have emanated. In some implementations, the map 16 can be a heat-map identifying a frequency of the access, and each country in the map 16 can be selectable by a user. Upon selection of a country, the user interface 10 can be updated to include user accounts that have been accessed from the selected country. In some implementations, the map 16 can be a map of a particular region (e.g., country, city, geographic area, and so on).

A user of the user interface 10 can mark a particular user account according to a "Triage Status" 30, which can include an identification of whether the particular user account needs further review, or has already been reviewed (e.g. the user can mark the particular user account according to a color code system such as red or green displayed in the graph 38). In this way, a different user can view the user interface 10, and identify a user account to review according to the "Triage Status" 30.

Additionally, the user interface 10 includes summary data describing user accounts associated with the business. For instance, the summary data can include a graph identifying a number of countries 32 that user accounts have been accessed from, a graph identifying a number of network accessible systems or "Hosts" 34 that each user account has used to access networks of the business, determined distribution of anomaly scores 36, and a graph identifying a number of user accounts for each "Triage Status" 38 identified by users of the user interface 10.

Utilizing the user interface 10, a user (e.g., a system administrator) can gain valuable insights into the user accounts associated with the business including network actions and network events associated with user accounts. The user can determine that a particular user account ("RLP8") is in need of further review, and can select the particular user account to view more detailed information, which is described below with reference to FIGS. 6-12.

Figure 2:
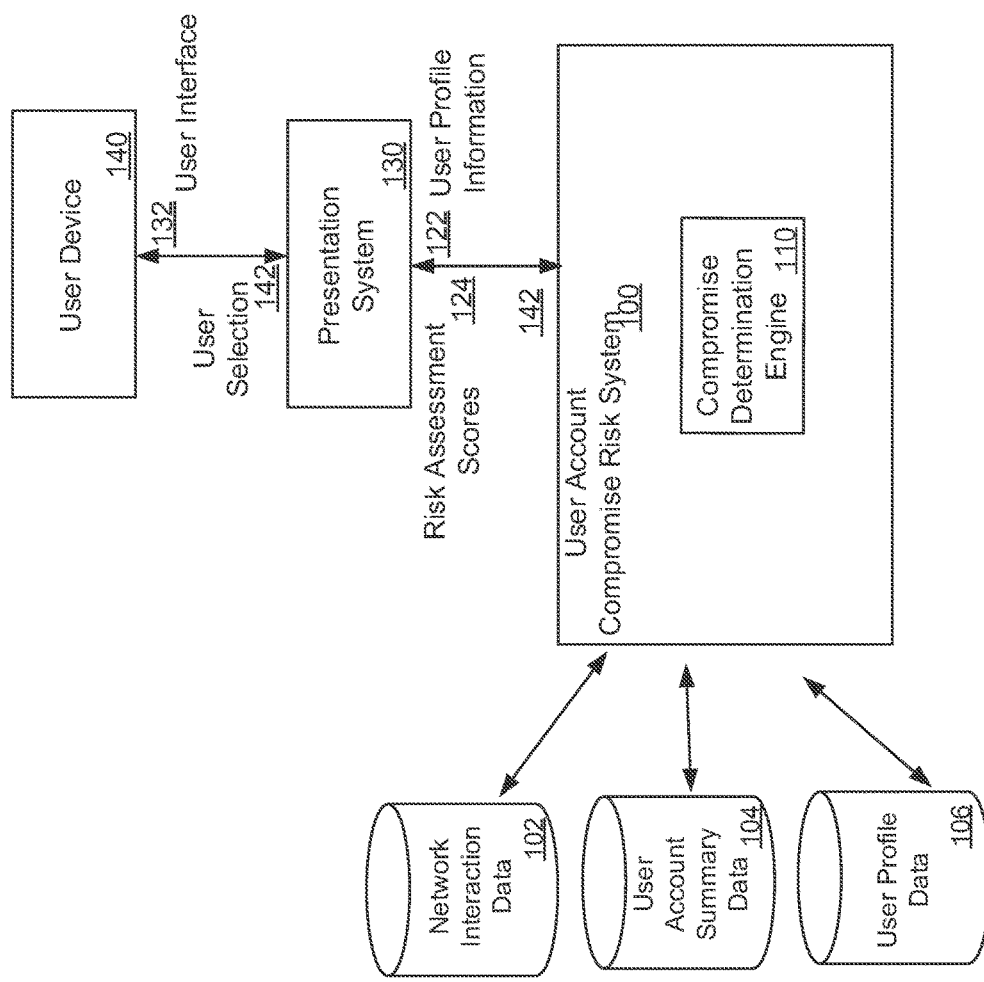
FIG. 2 illustrates a block diagram of an example user account compromise risk system.

FIG. 2 illustrates a block diagram of an example user account compromise risk system 100. The user account compromise system 100 (e.g., a system of one or more computers, or one or more virtual machines executing on a system of one or more computers) can obtain information identifying network actions of user accounts associated with a business, and determine user accounts to identify as potentially being compromised (e.g., by a malicious actor) for review by a user (e.g., by a system administrator, security officer, and so on).

To determine user accounts to identify for review, the user account compromise risk system 100 includes a compromise determination engine 110 that can determine user compromise scores for each user account, with each user compromise score being a measure of a particular type of user behavior that indicates, in part, the user account has been compromised (e.g., the user account is at a relative greater risk for being compromised).

For instance, as will be described below in FIG. 4, the compromise determination engine 110 can determine, for a particular user account, a host score (e.g., a score based on the network accessible systems (e.g., user devices) used by a user account to access the network), a speed score (e.g., a score based on a speed a person would have to travel between a first location, and a subsequent location, from which the particular user account was used), a location score (e.g., a score based on the locations from which the particular user account was used), a lateral movement and user chaining score (e.g., a score based on user accounts transitioned to, or accessed by, the particular user account), and an anomaly score (e.g., a score based on summary behavior of the particular user account in comparison to known or historical behavior of the particular user account).

The compromise determination engine 110 can obtain information from a network interaction database 102, which the user account compromise risk system 100 is in communication with, or in some implementations maintains. The network interaction database 102 stores information obtained from network accessible systems of the business, such as server systems, domain controllers, computers, laptops, checkout systems, point of sale systems, firewalls, virtual private network (VPN) servers, and so on. The information can include logs from each of the network accessible systems, and can include VPN logs, Active Directory logs, system logs, firewall logs, user account access records, and so on.

The network interaction database 102 can include identifications of events included across disparate logs that relate to network actions of each user account. The events can be ordered according to time (e.g., from time stamps included in logs), which provide a temporal history of network actions taken, or initiated, by each user account.

The compromise determination engine 110 can determine user compromise scores for a particular user by utilizing information obtained from the network interaction database 102 (e.g., data describing user behavior of the particular user account), and one or more models (e.g., machine learning models) describing normal (e.g., expected, measures of central tendency of) user behavior of user accounts with the business (e.g., user accounts associated with a same employee role as the particular user account). As an example, the compromise determination engine 110 can monitor user behavior (e.g., user actions, network actions, and so on) and update the normal behavior of each user account (e.g., upon the occurrence of any action, or periodically). In some implementations, the compromise determination engine 110 can utilize machine learning models (e.g., k-means clustering) to determine user behavior of user accounts with respect to other user accounts (e.g., cluster user accounts together). The machine learning models can also describe features that are indicative of user accounts being compromised, and can compare the features to user behavior being monitored. In this way, the compromise determination engine 110 can determine whether a particular user account's behavior is anomalous, or otherwise is an outlier with respect to determined normal user account behavior (e.g., normal to the particular user accounts behavior or to other user accounts). Additionally, the machine learning models can be updated periodically to maintain accuracy. The user compromise scores can be determined for each event, or in some implementations, the user compromise scores can be determined for a time period which includes multiple events.

For instance, if the particular user account is associated with an employee that is in Human Resources (HR), the user behavior of the particular user account can be compared to user behavior of other user accounts associated with employees in HR, or similar non-technical employee divisions. Similarly, if the particular user account is associated with a system administrator, or an employee engaged in network security, the user behavior of the particular user account can be compared to user behavior of other similar user accounts. In this way, the user compromise scores can be relative to normal user behavior of similar user accounts. In some implementations, the user compromise scores can be relative to normal user behavior of all user accounts associated with the business.

Additionally, the compromise determination engine 110 can be in communication with, or in some implementations maintain, a user account summary database 104 storing historical information regarding user accounts (e.g., the system 100 can monitor network actions of each user account, and determine summary data to include in the user account summary database 104). For instance, a particular user account can be normally used (e.g., accessed) from a particular location (e.g., Bolinas Calif. at the headquarters of the business), but occasionally from a different location (e.g., a foreign country at the home of a family member). If the normal user behavior of user accounts (e.g., determined by models as described above) does not include user account access from the different location, the particular user account can be determined to have a high location score (e.g., a score based on a risk level of locations from which the particular user account is used). However, using the user account summary database 104, the compromise determination engine 110 can determine that the location score should be lower, since the particular user account has historically been accessed from the different location.

Thus, the compromise determination engine 110 can determine user compromise scores from user account summary data describing normal (e.g., expected, measures of central tendency of) user behavior and also normal user behavior of other user accounts.

After determining user compromise scores, the user account risk system 100 can provide identifications of user accounts with associated user compromise scores to a presentation system 130. The presentation system 130 can be a system of one or more computers, or in some implementations can execute on the user account compromise system 100. The presentation system 130 is in communication with a user device 140 of a reviewing user (e.g., a system administrator, a security officer), and is configured to provide user interfaces 132 for presentation on the user device 140. The user interfaces 132 can be documents (e.g., web pages), which the user device 140 can receive and provide for presentation (e.g., render in a web browser).

The reviewing user can view the user interfaces 132 (e.g., the example user interface described in FIG. 1), and interact with the user interfaces 132 to receive different, or more detailed information, about the identified user accounts. For instance, the reviewing user can provide a user selection 142 of a particular user account, and receive detailed information associated with the particular user account including user profile data 106 (e.g., information identifying a name of an employee associated with the particular user account, a location in which the employee works, and so on). Examples of user interfaces are described below, with reference to FIGS. 6-12.

Figure 3:
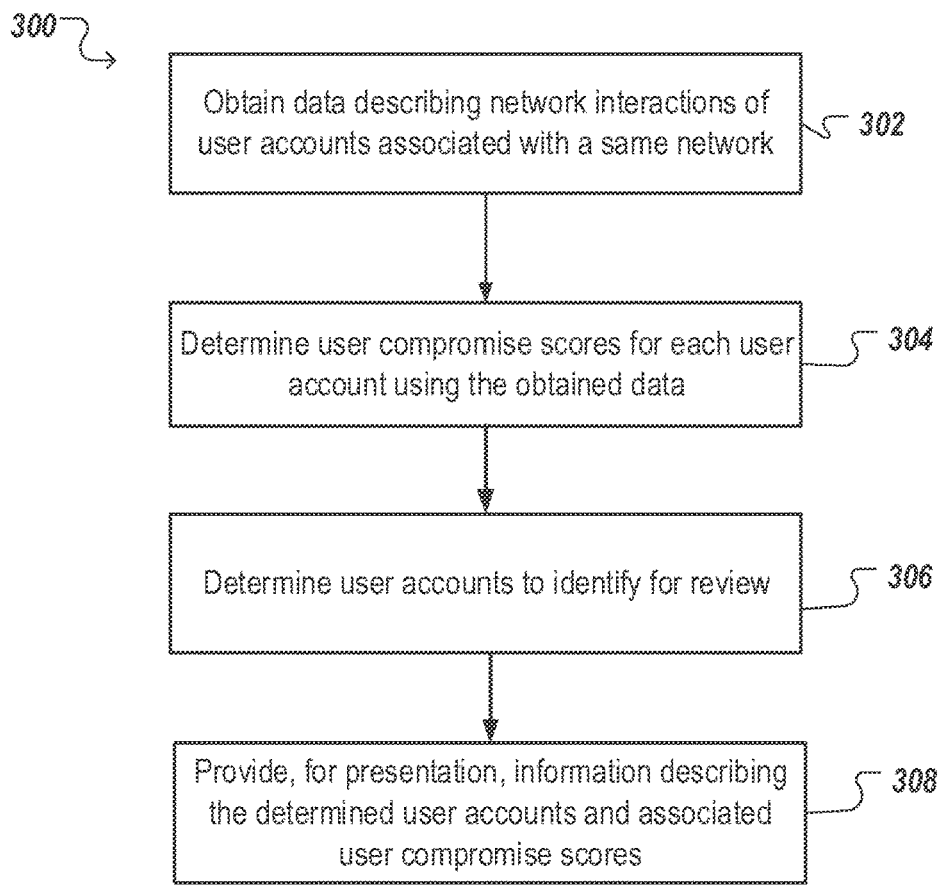
FIG. 3 is a flowchart of an example process for determining user accounts associated with a risk of compromise.

FIG. 3 is a flowchart of an example process 300 for determining user accounts associated with a risk of compromise. For convenience, the process 300 will be described as being performed by a system of one or more computers (e.g., the user account compromise system 100).

The system obtains data describing network actions of user accounts associated with a same network (block 302). The system obtains network action data from network accessible systems, with the network action data including virtual private network (VPN) logs, Active Directory (AD) logs, firewall logs, user account access records, system logs, and so on.

The system determines user compromise scores for each user account (block 304). As described above, each user compromise score measures a type of user behavior indicative of the user account being compromised. As will be described below, with reference to FIG. 4, the system determines user compromise scores for each user account, and can utilize summary data (e.g., historical information describing user behavior) of the user account along with one or more models identifying normal (e.g., expected) user behavior of user accounts (e.g., user accounts associated with employees that have a same or similar employee role). As will be described below, with reference to FIG. 4, the user compromise score for a particular type of user behavior can be normalized between two values (e.g., between zero and one).

The system determines user accounts to identify for review (block 306). After determining user compromise scores for each user account, the system determines user accounts that are to be identified for review (e.g., by a system administrator, security officer).

In some implementations, the system can assign a ranking (e.g., an order) to each user account based on the respective user compromise scores. To determine the ranking, the system can determine a weighted combination of user compromise scores, and assign the rankings according to an order of the weighted combination. In some implementations, the weights can be based determined using a machine learning model that identifies weights to identify overall user behavior that is most associated with a user account being compromised. In some other implementations, the weights can be user selected, and can be, as one non-limiting example, 0.7 for the speed score, 0.2 for the location score, and 0.1 for the host score.

Additionally, in some implementations, a single user compromise score can be utilized to determine the ranking of each user account. For instance, as will be described below with FIG. 4, an anomaly user compromise score is determined as a convolution involving weighted combinations of particular user compromise scores (e.g., a location score, a host score, a speed score) and a window function. The anomaly user compromise score can be utilized to assign rankings to the user compromise scores, with a higher anomaly score indicating a higher ranking.

Furthermore, as described above, in some implementations particular user compromise scores can be grouped together and presented on a same user interface. For instance, a "Remote Access" group includes user compromise scores associated with user behavior during initial access of user accounts. The "Remote Access" group can include the location score, host score, and speed score.

When determining user accounts to identify for review, the system can receive information identifying that a reviewing user (e.g., a system administrator) wants to view the "Remote Access" group of user compromise scores, and the system can determine a ranking of user accounts based on the user compromise scores included in the "Remote Access" group. An example of a user interface describing "Remote Access" is described above, with reference to FIG. 1.

Similarly, the system can receive information identifying that the reviewing user wants to view a "User Chaining" group of user compromise scores, and the system can determine a ranking of user accounts based on the user compromise scores included in the "User Chaining" group (e.g., user chaining score and/or lateral movement score). An example of a user interface describing "User Chaining" is described below, with reference to FIG. 10.

In some implementations, alternative to assigning a ranking, the system can identify user accounts for review upon determining that one or more of the user compromise scores are greater than a respective threshold for each user compromise score. For instance, if a user chaining score (e.g., described below with reference to FIG. 4) is greater than a threshold (e.g., greater than zero) for a particular user account, the system can identify the particular user account for review. As an example, if a user chaining score is greater than zero (e.g., a user account transitioned to a different user account), the system can identify the user account for review.

The system provides information describing the determined user accounts and associated user compromise scores for presentation (block 308). The system generates user interface data for presentation to a user device of a reviewing user (e.g., a system administrator). In some implementations, the system can generate a document (e.g., a web page) to provide to the user device. In some implementations, the system can provide information describing the determined user accounts and user compromise scores to a presentation system (e.g., as described above in FIG. 2), which is in communication with the user device.

As described above, with reference to FIG. 1, and as will be described below, with reference to FIGS. 6-12, the system can provide different user interfaces for presentation on the user device. For instance, as described above in FIG. 1, the system has provided a user interface describing "Remote Access" (e.g., in response to a request received from the reviewing user). Similarly, the system can provide a user interface describing "User Chaining" (e.g., in response to a request received from the reviewing user), described below with reference to FIG. 10.

The user interface data is configured to include selectable information, and the system can receive a user selection of particular information. The system can then obtain detailed information associated with the user selection, and provide the detailed information for presentation. For instance, the reviewing user can select a particular user account determined for review, and the system can generate user interface data which includes detailed information regarding the selected user account (e.g., as described below with reference to FIGS. 6-9 and FIGS. 10-12).

In this way, the reviewing user can initially view identifications of user accounts, and drill down into the specifics of each user account and the reasons the user account was determined to need reviewing. The reviewing user can pivot on information he/she finds interesting to obtain a holistic view of each user account. As an example, the reviewing user can select a particular user account, and receive detailed information regarding specific network accessible systems the particular user account accessed. The reviewing user can obtain information identifying that an employee associated with the particular user account reported a particular user device lost, or stolen, on a particular date. The reviewing user can then determine whether the particular user account accessed the particular user device after the particular date, and upon a positive determination, determine that the particular user account was compromised.

Figure 4:
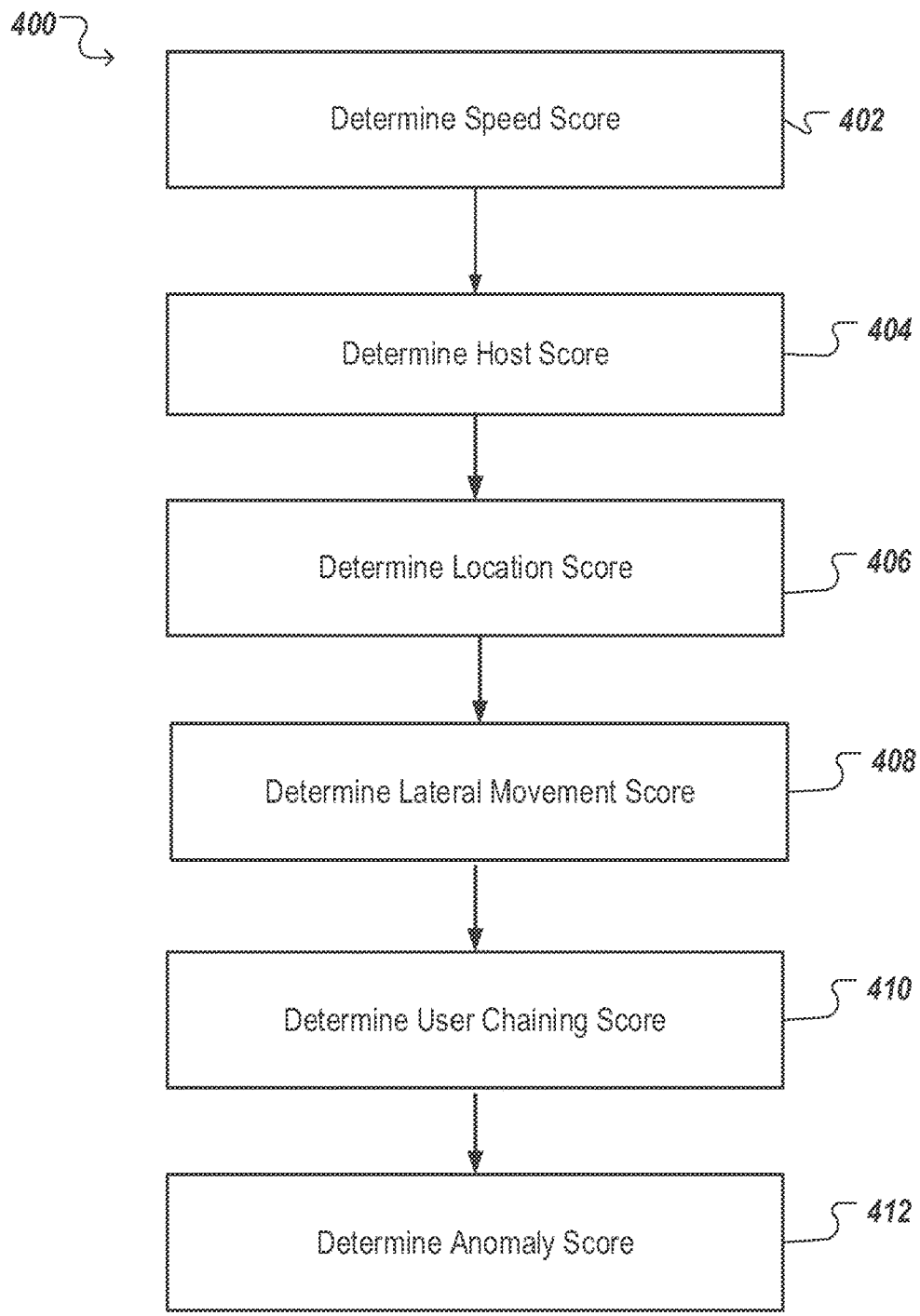
FIG. 4 is a flowchart of an example process for determining user compromise scores for a user account.

FIG. 4 is a flowchart of an example process 400 for determining user compromise scores for a user account. For convenience, the process 400 will be described as being performed by a system of one or more computers (e.g., the user account compromise system 100).

As described above, the system determines user compromise scores in any order, and does not need to follow the order of the blocks in process 400, or determine all of the user compromise scores. Additionally, the system can determine each user compromise score periodically (e.g., after passing of a particular time period) utilizing information describing network actions of user accounts from the periodic time period (e.g., information obtained after the end of a previous periodic time period and before the start of the subsequent period time period). Alternatively, or in addition to, the system can determine each user compromise score after receiving a request from a reviewing user (e.g., a system administrator) for the user compromise scores to be determined. The request can also include an identification of a particular time period, and the system can obtain information describing network actions of user accounts from the particular time period.

As described in FIG. 2, the system can determine events describing temporal network actions of each user account. For instance, a first event could be the user account being accessed through a remote access session. A second event could be the user account transitioning to a different user account, or the user account being accessed again in a different remote access session. In some implementations, the system can determine each of the user compromise scores for each event, and sum the respective user compromise scores through a period of time selected by a reviewing user.

The system determines a speed score for the user account (block 402). As described above, the speed score measures how likely it is that a single person has used (e.g., accessed) the user account from disparate locations in a period of time.

To determine the speed score, the system obtains an internet protocol (IP) address associated with the access of the user account, which in some implementations can be obtained from system logs including virtual private network (VPN) logs (e.g., the user account was accessed through a VPN server). The logs can include an identifier of the user account, a timestamp of the access, and an IP address associated with the requesting user device.

The system identifies two subsequent uses of the user account, and obtains the IP address and timestamp of each access. The system then determines a location associated with the IP, which in some implementations can be a region, country, city, latitude, longitude, of the location. The system computes a distance between the locations, and divides the distance by a difference in timestamps. The result of the computation is designated as a speed of travel between the two locations.

In some implementations, the system can access one or more models identifying normal user behavior of user accounts associated with a same business, and determine the speed score by comparing the speed of travel to one or more threshold speeds (50 m/s, 102 m/s, 300 m/s, 400 m/s) identified by the models. The threshold speeds can each be associated with a particular speed score (e.g., the lowest threshold can be associated with score 1, and each successive threshold can add 1), and the system can assign the speed associated with the highest threshold speed that is below the speed of travel. Additionally, the system can obtain information identifying a probability of travel for an employee role associated with the user account (e.g., a sales person might need to travel more often than someone in human resources). The system can modify the speed score based on the obtained probability (e.g., the speed score can be greater by a constant multiplier, 1.1, 1.2, 1.3, if the speed of travel is greater than a threshold and the probability of travel is low).

In some implementations, the system can determine the speed score using summary data of the user account (e.g., historical information). The summary data can identify, for instance, historical speed scores and associated speeds of travel. If the summary data routinely includes high speeds of travel, the system can determine that an employee associated with the user account travels around a lot, and thus the system can assign a lower speed score than a different employee that does not travel (e.g., using a constant multiplier such as 0.9, 0.8, 0.3, or by subtracting a constant from the speed score determined using the model).

In implementations in which the system has summary data and model information identifying normal user behavior, the system can combine the information (e.g., weight respective speed scores determined using the summary data and model information) to determine an overall speed score.

The system determines a host score for the user account (block 404). As described above, the host score is a measure associated with the network accessible systems used to access one or more networks and/or other network accessible systems of the networks.

To determine the host score, the system determines a number of network accessible systems used by the user account. As described above, the information can be obtained from logs, including VPN logs, user access logs, and so on.

After determining a number of network accessible systems, the system can access one or more models identifying normal user behavior of user accounts, and obtain one or more threshold values each indicating a number of network accessible systems. The system can compare the number of network accessible systems to the threshold values, and assign a host score based on the comparison. For instance, each threshold value can be associated with a particular host score (e.g., 1, 2, 3), and the system can identify the closest threshold value that is less than the number of network accessible systems the user account accessed. Additionally, the threshold values can be associated with employee roles, and the system can utilize the threshold values associated with a same, or similar, employee role as the user account.

The system can also obtain summary data describing user behavior of the user account (e.g., historical user behavior), and determine whether the determined number of network accessible systems is greater than, or less than, a number of network accessible systems identified in the summary data (e.g., a measure of central tendency of historical numbers of network accessible systems). The system can then assign a host score based on a difference between the summary data and the determined number of network accessible systems (e.g., if the user account is suddenly using a large number of network accessible systems, but normally uses one network accessible system, the system can assign a high host score such as 2, 3, 4).

In implementations in which the system has summary data and model information, the system can combine the information (e.g., weight respective host scores determined using the summary data and model information) to determine an overall host score.

In addition to determining the host score using numbers of network accessible systems utilized by the user account, the system can utilize the summary data to determine whether the user account is using network accessible systems that have not, or rarely, been previously used. The host score can be modified based on the determination (e.g., the host score can be increased by a constant multiplier, or by a constant value, if the user account is using network accessible systems the user account has not previously utilized). Furthermore, in some implementations, the system can obtain information identifying a risk level associated with each network accessible system, and modify the host score based on the risk levels (e.g., apply a constant multiplier or add a constant such as 1, 2). For instance, if the user account is using an insecure network accessible system to generally access one or more networks (e.g., insecure operating system, unpatched software, no password on the system, automatic log-in of the network upon powering of the network accessible system, and so on), the host score can be increased The system determines a location score for the user account (block 406). As described above, the location score measures risk associated with the locations from which the user account was used. The system can obtain information identifying locations from virtual private network (VPN) logs providing access to the user account, or from other user access record or system logs.

The system can determine the location score by comparing the locations from which the user account was used, to one or more models describing normal user behavior of user accounts. If the system determines any deviations from the normal user behavior, the system can increase the location score (e.g., by 1 for each event). The system can access the models and obtain normal locations utilized by persons (e.g. employees) to access their user accounts (e.g., locations from which the persons use their user accounts). A normal location can be identified as a location utilized more than a threshold number of times (e.g., the threshold can depend on a number of employees), or a normal location can be identified as any location that is related to a business purpose of a business (e.g., a location in which an office of the business is located, a location in which contractors are hired, a location in which the business does business, and so on). A normal location can also be identified as any location not associated with malicious activity (e.g., a location from which malicious activity is known, or has been previously seen, to be emanating from). A normal location can also depend on a role of employees associated with user accounts, for instance, employees that generally do not travel for business purposes can have normal locations identified as the locations associated with their workplace (e.g. radii surrounding the workplace).

In some implementations, the system can determine network traffic coming from a virtual private network (VPN) not associated with the business (e.g. an anonymizing VPN). To identify the anonymizing VPN, the system can have information stored identifying IP addresses associated with the VPN. The system can then determine whether network traffic associated with one of the IP addresses is attempting to access (e.g., use) the user account. Upon a positive determination, the system can assign a high score to the location score (e.g., 2, 3, 4).

Additionally, the system can access summary data describing user behavior of the user account (e.g., historical user behavior), and determine whether the locations from which the user account was used have never, or atypically, been included in the summary data. Upon a positive determination, the system can assign a high location score (e.g., 1, 2, 3).

In implementations in which the system has summary data and model information identifying normal user behavior, the system can combine the information (e.g., weight respective location scores determined using the summary data and model information) to determine an overall location score.

The system determines a lateral movement score (block 408). The lateral movement score is a measure associated with the behavior in which a user traverses the network. This score is determined based on the types of assets (e.g., network accessible systems) a user logs into, the applications used (e.g., initiated) by the user, the temporal activity of the user and the types of logons performed (e.g. interactive logon, RDP (Remote Desktop Protocol), and so on).

For instance, if the user account transitions to a domain controller (e.g., a network accessible system associated with a high risk level), or other system associated with a high risk level, which the user account has not previously, or rarely, accessed, the lateral movement score can be increased. Furthermore, the system can obtain information describing applications, or other executable code, known to be safe, and increase the lateral movement score upon determining that the user account is initiating applications, or other executable code, not known to be safe. Similarly, the lateral movement score can be increased if the user account initiates applications, or other executable code, known to be malicious.

The system determines a user chaining score (block 410). The user chaining score is a measure associated with user behavior after the user account is accessed.

The system can obtain information describing user behavior after accessing (e.g., logging into) the user account from user access records (e.g., records identifying connections to network accessible systems), from VPN logs, and from system records (e.g., records identifying an IP address connection received by the system, a user account accessed, and a subsequent user account or network accessible system accessed; additionally the records can identify processes initiated by a user account, network requests or traffic to other network accessible systems initiated by a user account; and so on). Using the information described above, the system can determine user accounts switched to by the user account, and actions the user account took (e.g., initiating processes associated with executable code, or initiating scripts).

The system can access one or more models identifying normal user behavior of user accounts after the user accounts are accessed. For instance, the models can identify a frequency that user accounts transition to other user accounts, and specifically a frequency in which user accounts transition to user accounts with escalated privileges (e.g., escalated access rights associated with an access control list (ACL)). As an example, a service technician might have a normal user account for performing his/her day to day business, and a special service account with escalated privileges. The system can also obtain information identifying a normal amount of network traffic that a user account might generate (e.g., a malicious actor might execute scripts to obtain large amounts of stored data and provide it over a network to his/her computer). Additionally, the models can identify a number of network accessible systems that a normal user account accesses (e.g., in a period of time). For instance, a malicious attacker might access a large number (e.g., 4, 8, 12) of network accessible systems in a short period of time (e.g., 30 minutes, one hour, 12 hours).

The system can determine a user chaining score based off a comparison of user behavior of the user account to the normal user behavior (e.g., the system can assign a higher user chaining score, such as 1, 2, 3, to each determined deviation from the normal user behavior). Additionally, the system can compare user behavior of the user account to normal user behavior of user accounts associated with a same employee role. For instance, if the user account is associated with a human resources (HR) employee, and the normal user behavior for HR employees does not include transitioning to a privileged user account, the system can assign a higher user chaining score.

The system can also obtain summary data describing normal user behavior of the user account, and determine deviations from the user behavior of the user account. The system can increase the user chaining score (e.g., by a constant or a multiplier) upon determining deviations (e.g., based off a degree of the deviation).

In implementations in which the system has summary data and model information identifying normal user behavior, the system can combine the information (e.g., weight respective user chaining scores determined using the summary data and model information) to determine an overall user chaining score.

The system determines an anomaly score for the user account (block 412). As described above, the anomaly score is an aggregate measure of anomalous user behavior, and can be determined as an aggregate measure of multiple user compromise scores (e.g., location score, host score, speed score).

To determine the anomaly score, the system obtains information describing network actions of the user account (e.g., as described above, the system can obtain logs and identify entries or events in the logs associated with network actions of the user account). The system orders each of the network actions according to a time associated with each network action (e.g., a time stamp included in a log).

After ordering the network actions, the system determines a host score, a location score, and a speed score, for each network action. The system can apply a weighting to each user compromise score (e.g., the speed score can be weighted highest such 0.7, 0.6; location score weighted less than the speed score, such as 0.3, 0.2; and the host score weighted least, such as 0.1, 0.2), and determine an overall user compromise score for each network action.

The system computes a convolution of the weighted user compromise scores for each network action with a function that aggregates a particular number of the network actions, with each network action associated with a particular weight (e.g., a window function is applied that decays at the tail ends). In some implementations, the convolution can be of the weighted user compromise scores and a function that aggregates over a particular time period (e.g., time periods can include varying numbers of network actions).

The system assigns the result of the convolution as the anomaly score (e.g., the system can first normalize the computed convolution result). Since the anomaly score is an aggregate of user compromise scores across network actions, the system can utilize the anomaly score as an overall user compromise score which can be used, for example, to rank (e.g., prioritize) user accounts for review.

In some implementations, additional user compromise scores can be determined based on network and/or user actions. For instance, an application score can be determined (e.g., a score based on the types or numbers of applications accessed or initiated by user accounts). The application score, and any additional scores, can be used to determine an anomaly score (e.g., a more robust anomaly score).

Determining an anomaly score is further described in U.S. patent application Ser. No. 14/970,317 entitled "IMPROVED NETWORK ANOMALY DETECTION," filed on Dec. 15, 2015, which is hereby incorporated by reference in its entirety.

Figure 5:
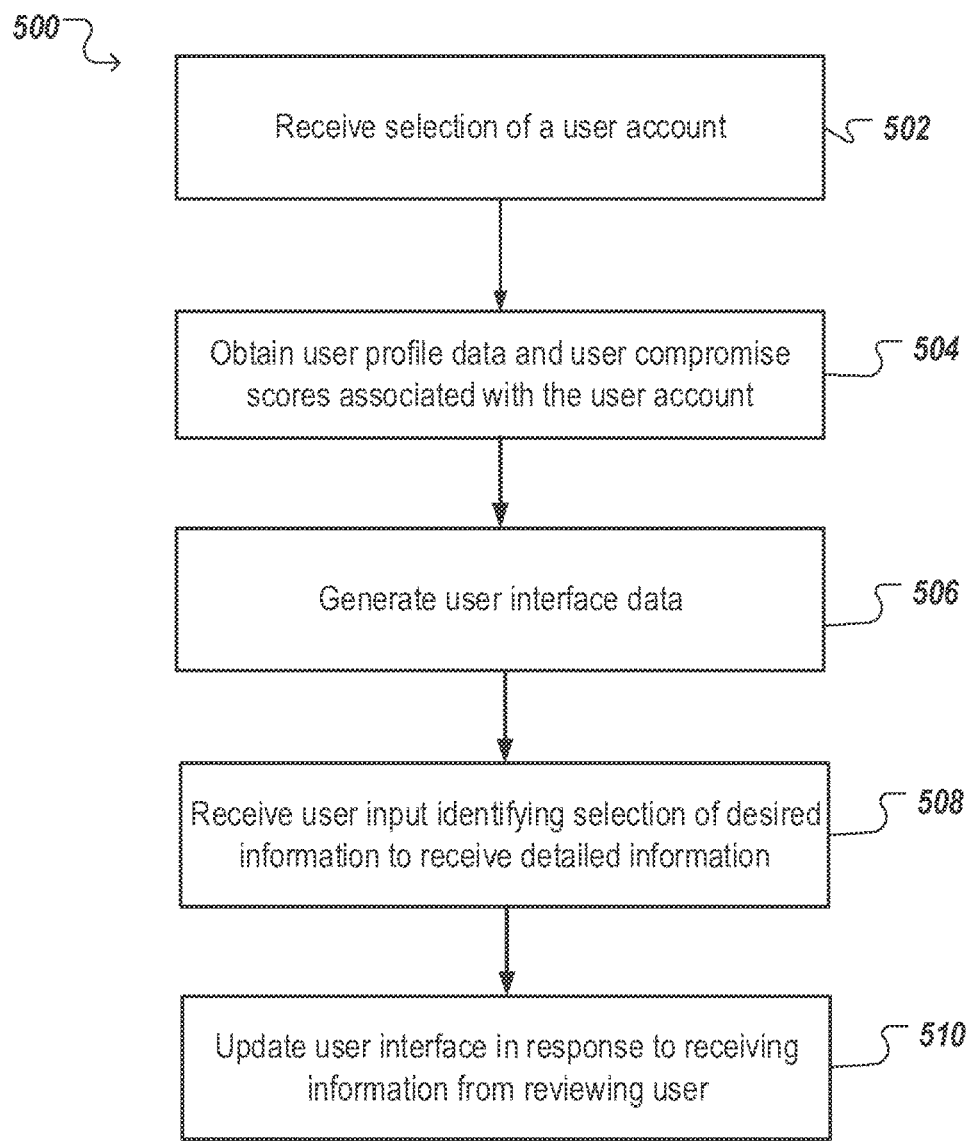
FIG. 5 is a flowchart of an example process for presenting detailed information associated with a user account for review by a user.

FIG. 5 is a flowchart of an example process 500 for presenting detailed information associated with a user account for review by a user. For convenience, the process 500 will be described as being performed by a system of one or more computers (e.g., the user account compromise system 100).

The system can be in communication with a user device of a reviewing user (e.g., a system administrator, a security officer, a service technician), and the reviewing user can be reviewing information describing user accounts identified by the system for review. For instance, the reviewing user can provide a request to the system for a user interface (e.g., the reviewing user can access a web page), and the system can provide the user interface. As an example, the reviewing user can request the user interface 10 described in FIG. 1, and view information describing "Remote Access" (e.g., user behavior upon initiation of access to user accounts). Alternatively, the reviewing user can receive the user interface described in FIG. 10, and view information describing "User Chaining" (e.g., user behavior after access of user accounts).

The system receives a selection of a user account from the reviewing user (block 502). As described above, the reviewing user can be viewing a user interface describing one or more user accounts determined by the system to be reviewed. The reviewing user can select a user account he/she is interested in, and the system can receive information identifying the selected user account.

After receiving the selection, the system obtains information describing the selected user account and associated user compromise scores (block 504). As described above, the system stores user profile data associated with each user account, including an employee role associated with the user account, a name associated with the user account, user access rights (e.g., obtained from an access control list, Active Directory information), and so on. Additionally, the system can obtain information associated with user compromise scores for the selected user account. For instance, the system can obtain identifications of locations from which the user account was used, network accessible systems used to access networks associated with the user accounts, user behavior after the selected user account was used (e.g., transitions to other network accessible systems, transitions to other user accounts, escalation of privileges), and so on.

The system generates user interface data describing the obtained information (block 506). The system can generate user interface for presentation on the receiving user's user device (e.g., the system can generate a web page including at least a portion of the obtained information).

The system receives information identifying a selection of a portion of the obtained information (block 508). The system receives information from the reviewing user to view specific information. For instance, the reviewing user can request information associated with user compromise scores for a particular time period (e.g., locations from which a user account was used in the particular time period). Additionally, the reviewing user can request information associated with specific access rights of the user account, the reviewing user can request information regarding notes or descriptive text input into the system for a present, or previous, time period (e.g., by the reviewing user or a different reviewing user), and so on. Examples of user interfaces are described below, with reference to FIGS. 6-12.

The system updates the user interface in response to receiving information from the reviewing user (block 510). In updating the user interface, the system determines information to obtain (e.g., from databases 102-106), and can, for example, generate updated user compromise scores, analyze the obtained information to provide graphic representations of complex information relevant to the reviewing user's request, and so on.

For instance, the reviewing user can request detailed information regarding the selected user account's user chaining score. The system can obtain information identifying user accounts that the selected user account transitioned to, and user accounts the transitioned to user accounts transitioned to. After obtaining the above information, the system can update the user interface to include a graphical representation of each transition, which is described below with reference to FIG. 12.

User Interfaces

User interfaces described in FIGS. 6-12 are examples of user interfaces generated by the system, or a presentation system in communication with the system, and presented on a user device. In some implementations, the user interfaces can be presented on the user device as a document (e.g., a web page) in an application (e.g., a web browser).

Each of the user interfaces described below includes user selectable options that upon selection can cause the system to obtain associated information (e.g., from databases 102-106), determine updated user compromise scores or other information, and modify, or generate, user interface data. The user interfaces can provide a reviewing user (e.g., a system administrator, a security officer, a service technician) insights into complex networks with large numbers of user accounts by obtaining disparate information from logs spread across network accessible systems, and providing easy to understand summary data of user behavior of each user account.

Each example user interface described below includes a selectable option for the reviewing user to specify a particular time range that interests him/her. Upon receiving a selected time range, the system can access one or more databases (e.g., databases 102-106) and determine information associated with the time range to provide to the reviewing user.

FIG. 6 is an example user interface 600 of an investigative history of a user account selected for review. The user interface 600 can be, for example, provided to a user device after receiving a selection of a user account for review (e.g., as described above in FIG. 5).

The user interface 600 includes an identification of the user account 602 under review, including an identification of a number of open investigations 604, and a triage status 606 identifying whether the user account needs further review, is determined to be malicious, or is determined not to be malicious.

The user interface 600 further includes user selectable options 608 identifying information available for review. The selectable options include "Investigative History", which is described in the present figure of FIG. 6; "Active Directory", which is described in FIG. 7; "Remote Access", which is described in FIG. 8; and "User Chaining", which is described in FIG. 12.

The user interface 600 includes descriptions 610 of prior, or present, investigations. For instance, as illustrated in the example of FIG. 6, a prior investigation is included, and includes an identification of a time period reviewed, a reviewing user, a present status and judgment, and in some implementations can include details regarding the investigation. In this way, a reviewing user can view prior investigations to see if the prior investigation is pertinent to a current investigation.

FIG. 7 illustrates an example user interface 700 identifying user profile data of the selected user account. The user interface 700 includes an identification of the selected user account 702 (e.g., as described above with reference to FIG. 6), and the user interface 700 is presented after the reviewing user selected the "Active Directory" 702 selectable option.

As illustrated in the user interface 700, the "Active Directory" 702 selectable option is associated with user profile data of the selected user account (e.g., the system can obtain user profile data from the user profile database 106 and user account summary database 104). User profile data includes a name associated with the user account 704 (e.g., "Name"), an employee role associated with the user account 706 (e.g., "Title: Contractor"), information describing the particular employee role 708 (e.g., "Division: 9090", "Dept.:

753—IT HR SYSTEMS"). Additional information 710 is included, including an email address associated with the user account, a manager of the employee, and account information.

The user interface 700 further includes user access rights information 712 (e.g., information obtained from access control lists (ACL) or Active Directory information), and identifies "Group Membership" information for particular groups the user can access.

Utilizing the user interface 700, the reviewing user can quickly identify the scope of user access rights the user account has, and information regarding the employee role to ascertain how sought after of a target the user account is. Additionally, the reviewing user can determine which network accessible systems can be affected (e.g., accessed) by the user account based on the user access rights information 712.

Figure 8:
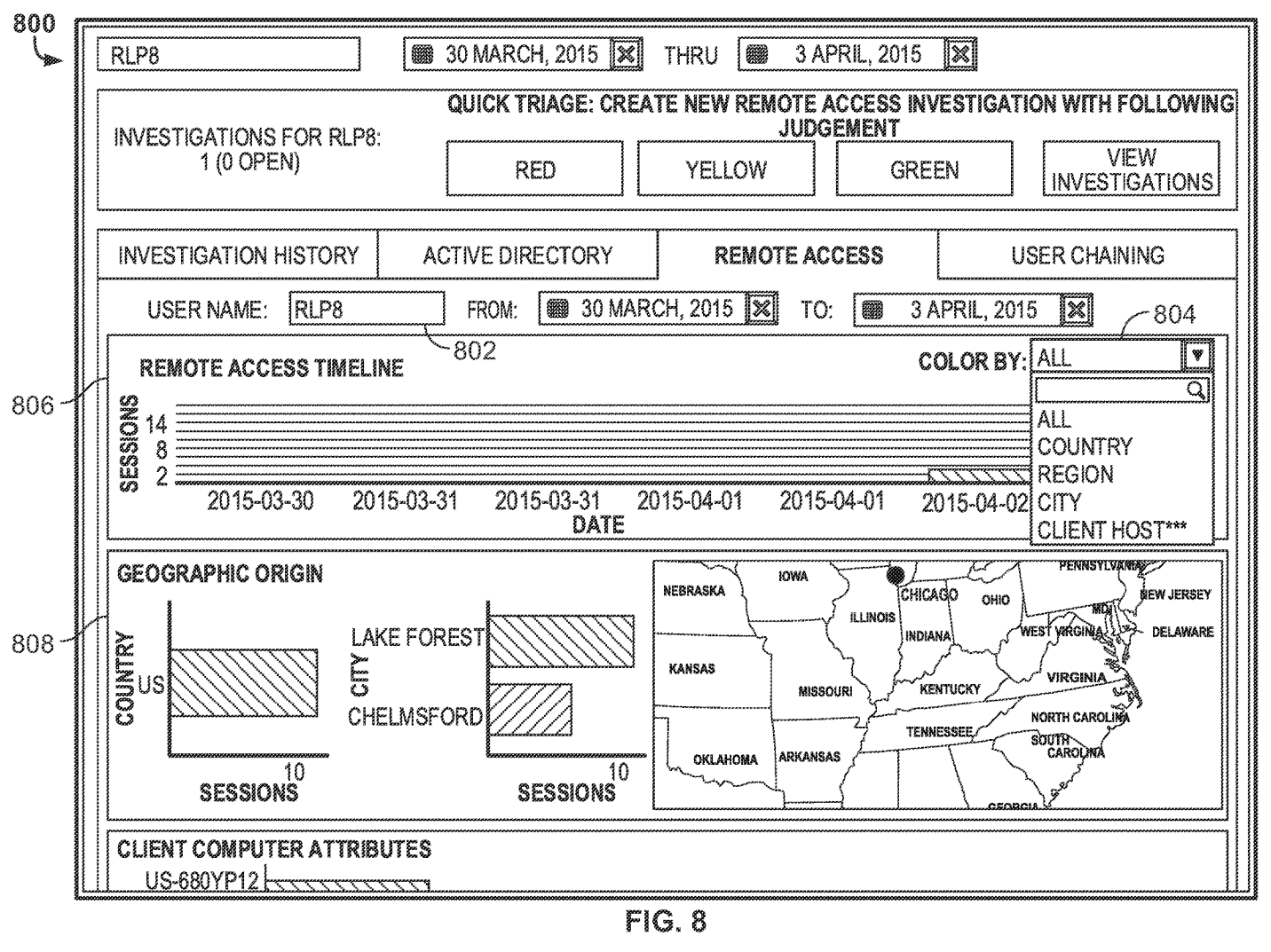

FIG. 8 illustrates an example user interface 800 describing remote access information associated with the selected user account. The user interface 800 can be presented, by the system, upon user selection of the "Remote Access" selectable option. As described above, the "Remote Access" selectable option provides information describing user behavior associated with initiating access to the selected user account 802.

The user interface 800 includes selectable options 804 associated with different types of information related to "Remote Access." Upon selection of an option 804, the system can provide information as a chart, or graph, describing the selected option in a "Remote Access Timeline" 806. The "Remote Access Timeline" 806 provides information associated with each option 804, from a date range identified by the reviewing user, in a legible chart or graph format.

For instance, for the selectable option 804 "Country", the system can provide a chart 806 of the specific countries from which the selected user account 802 was accessed, on particular dates in a date range identified by the reviewing user.

Similarly, for the selectable options 804 "Region" and "City", the system can provide a chart 806 of the specific regions, and cities, from which the selected user account 802 was accessed.

The selectable options 804 further include "Client Host Name", and upon selection of the "Client Host Name" option, the system can provide a chart 806 of specific network accessible systems the selected user account 802 utilized to access one or more networks of interest to the reviewing user. An example of the reviewing user selecting "Client Host Name" is described below, with reference to FIG. 9.

The user interface 800 further includes information describing a geographic origin 808, and an identification of countries, and cities, from which the selected user account 802 was accessed from, compared against a number of remote access sessions to the selected user account 802.

Figure 9:
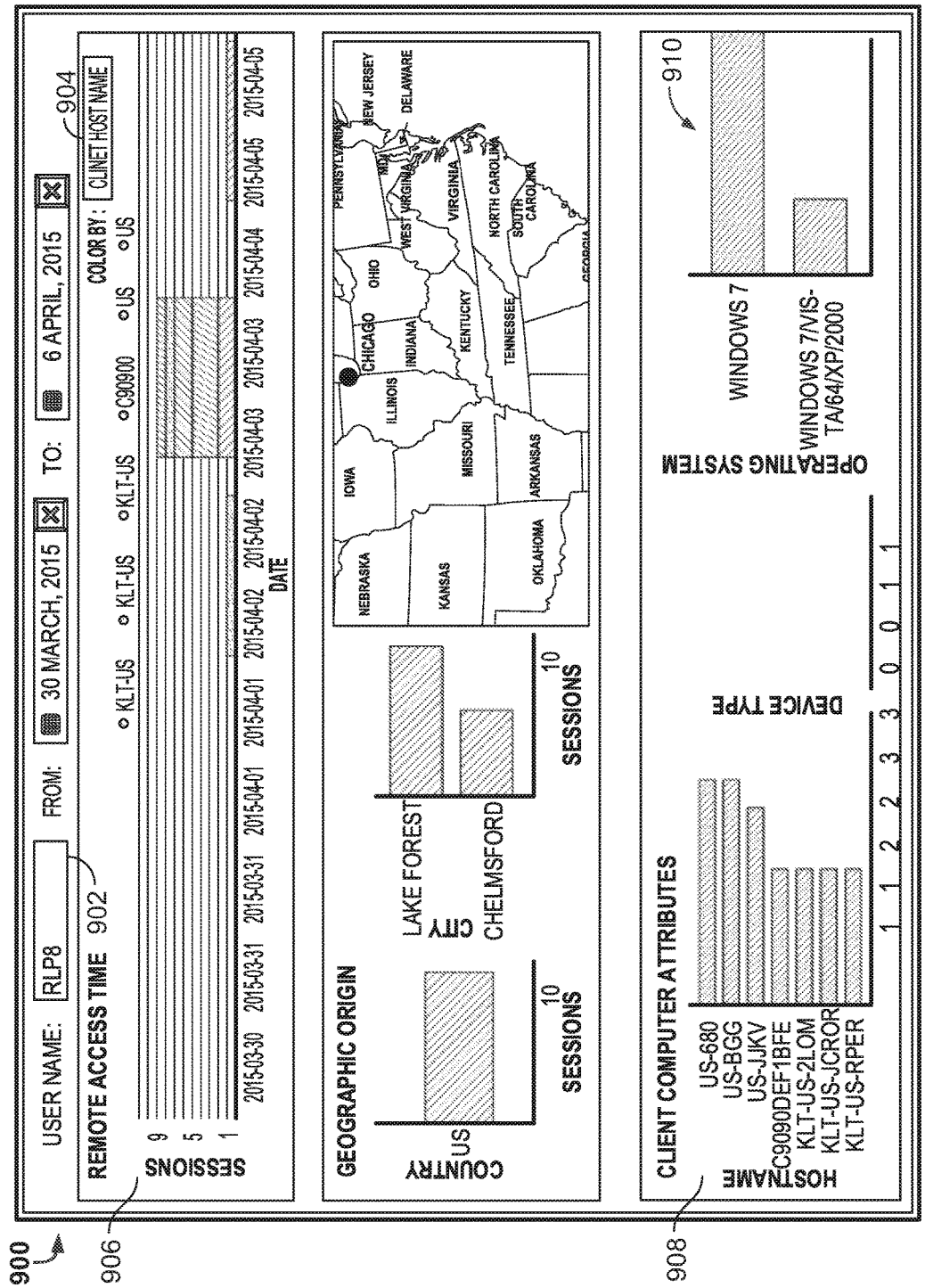
FIG. 9 illustrates an example user interface provided upon selection of a "Client Hostname" selectable option.

FIG. 9 illustrates an example user interface 900 provided upon selection of a "Client Hostname" selectable option. As described above, with reference to FIG. 8, the user interface 800 includes selectable options, which upon selection cause the system to provide information in a chart, or graph, related to the selectable option. In the user interface 900, the reviewing user has selected "Client Hostname" 904, and the "Remote Access Timeline" 906 is updated to chart the network accessible systems used (e.g., client computer as indicated in FIG. 9) utilized by the selected user account 902 (e.g., to access the networks) in a time period selected by the reviewing user. The chart 906 includes times (e.g., dates included in the selected time period) mapped against a number of remote access sessions involving particular network accessible systems. For instance, a network accessible system associated with a name "KLT-US-RPER" was used by the selected user account 902 to access the networks. The chart 906 illustrates that the network accessible system was used twice by the selected user account 902 on "2015-04-03".

As an example, the reviewing user can utilize the user interface 900 to identify all network accessible systems used by the selected user account 902 (e.g., from the chart 906).

The user interface 900 further includes information associated with the network accessible systems (e.g., "Client Computer Attributes" 908), and includes operating systems utilized 910, specific versions of software installed on each network accessible system, user access rights associated with each system, and so on. The information can be user selectable, and upon selection of a particular portion of information, the system can provide information regarding the selected portion.

For instance, the reviewing user can select a particular operating system 910 (e.g., "Windows 7"), and the user interface 900 can be updated to identify the network accessible systems used by the selected user account 902 that utilize the particular operating system. Additionally, the updated user interface can include specific version information (e.g., patches installed) for each network accessible system that utilizes the particular operating system. In this way, the reviewing user can identify whether a malicious actor might have obtained access to a network accessible system (e.g., to use the network accessible system to access the networks) that is utilizing an operating system with an old version.

Figure 10:
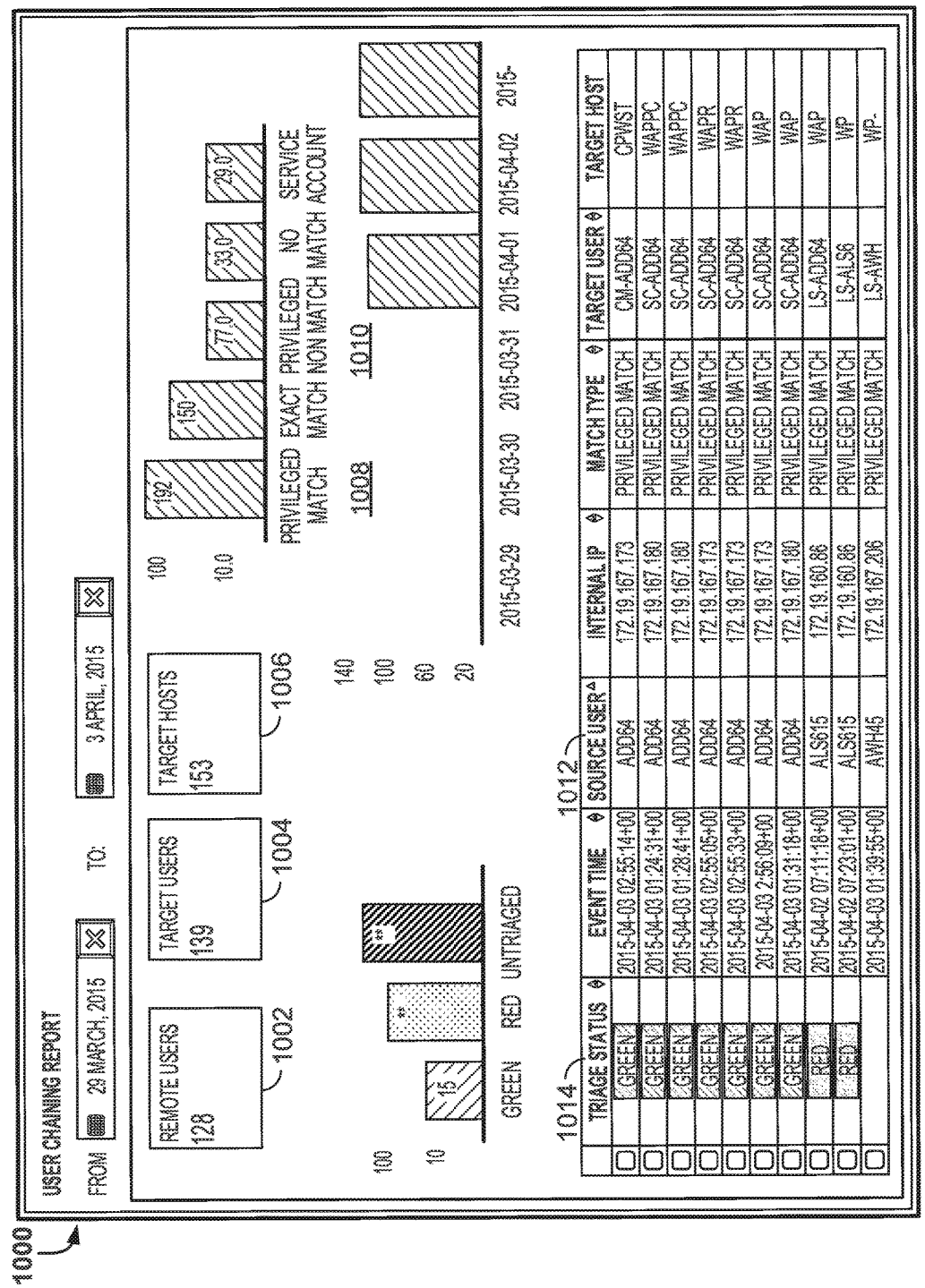
FIG. 10 illustrates an example user interface describing user chaining information associated with user accounts identified for review.

FIG. 10 illustrates an example user interface 1000 describing user chaining information associated with user accounts identified for review. As described above, user chaining includes user behavior of user accounts after the user accounts are accessed. User behavior for a particular user account can include transitioning (e.g., switching) to a different user account and/or different network accessible system (e.g., different host). The user interface 1000 can be presented upon receiving a request, from a user, identifying that he/she wants to view user chaining information. For instance, the user can access a web page, and select an option identifying "User Chaining".

The user interface 1000 includes an identification of a number of "Remote Users" 1002 (e.g., user accounts which were used in remote sessions), a number of "Target Users" 1004 (e.g., a number of user accounts that were transitioned to from an initially utilized user account), and a number of "Target Hosts" 1006 (e.g., a number of transitioned to network accessible systems that were).

When determining a user chaining score (e.g., described above with reference to FIG. 4), the system determines whether a particular user account transitioned to another user account with escalated privileges. Since an employee might have two user accounts (e.g., one user account with normal privileges, and one user account with escalated privileges to perform administrator functions), the system determines whether the transition to a second user account occurred by a same employee associated with each user account.

That is, a transition to a privileged user account from a non-privileged user account can be identified as a "Privileged Match" 1008, if each user account is associated with a same employee. Similarly, a transition to a privileged user account from a non-privileged user account can be identified as a "Privileged Non-Match" 1010, if each user account is not associated with a same employee. The "Privileged Non-Match" 1010 can indicate that a malicious actor was able to improperly transition to a privileged user account.

The user interface 1000 includes representations of a number of different user account transitions, including a number of "Privileged Match" 1008 user account transitions, a number of "Exact Match" transitions (e.g., a number of user accounts that transitioned to a non-privileged user account, with each transition associated with a same employee), a number of "Privileged Match" 1010 transitions, a number of "No Match" transitions (e.g., a number of user accounts that transitioned to a non-privileged user account, with each transition associated with a different employee), and a number of "Service Accounts" (e.g., a number of transitions to service accounts).

The user interface 1000 identifies user accounts 1012 that transitioned to a different user account, along with information describing the transition. For instance, a first entry identifies an "Event Time" (e.g., a time the transition occurred), a source user account 1012 (e.g., "add64"), an internal Internet Protocol (IP) address associated with the source user account 1012, a "Match Type" (e.g., a transition type which as illustrated is "Privileged Match"), a target user account (e.g., "cm-add64"), and a "Target Host" (e.g., a target network accessible system). The user interface 1000 further identifies a "Triage Status" 1014, which as described above identifies whether a particular user account has been reviewed by a reviewing user. A reviewing user can determine (e.g., based off a target host), that a target host is a high value target (e.g., a domain controller), and determine that a user account was likely compromised based on a review of the 'Source User' (e.g., an employee that does not deal with network security likely should not be accessing to a domain controller).

Figure 11:
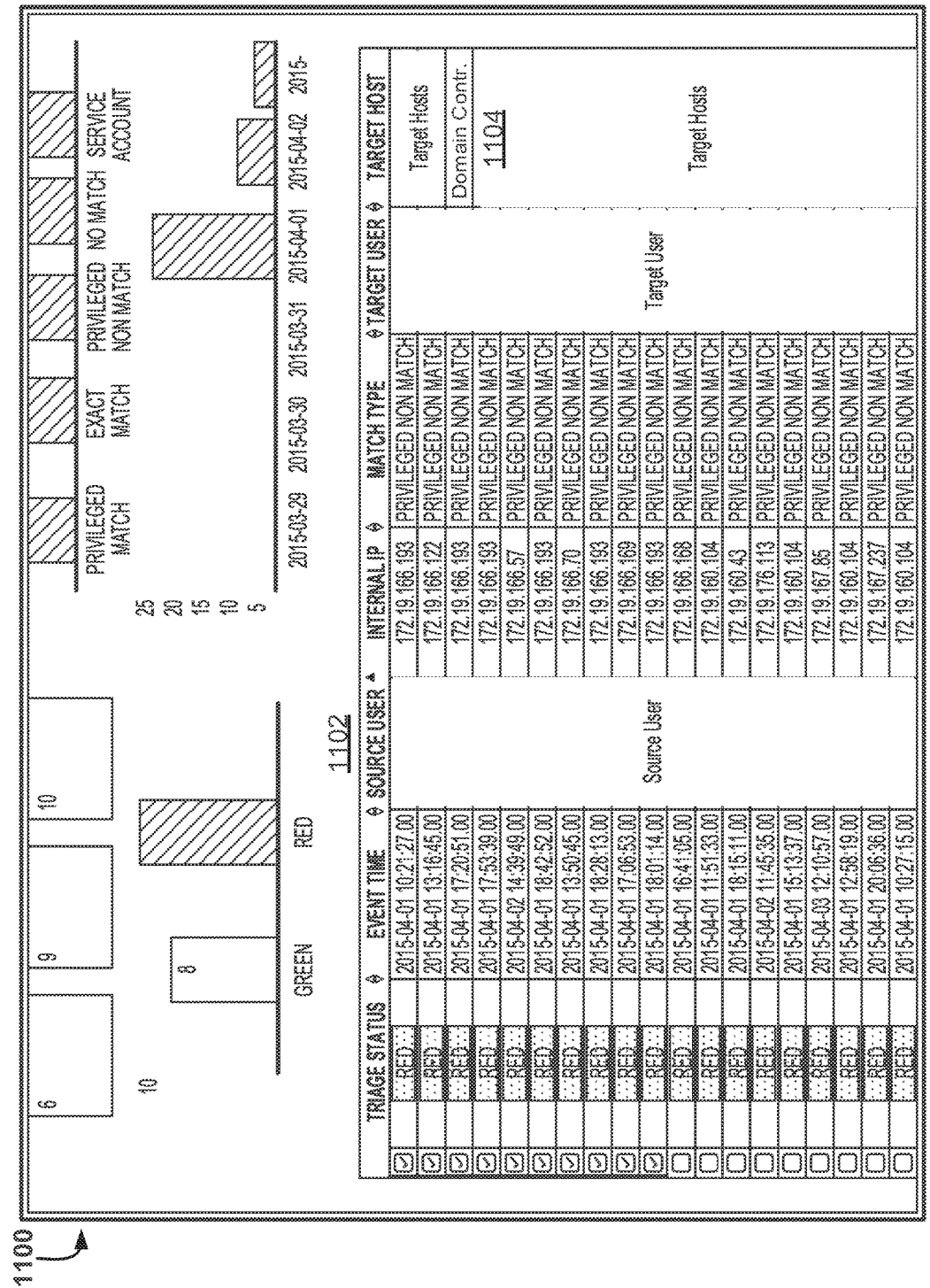
FIG. 11 illustrates an example user interface describing user chaining information associated with a selected user account.

FIG. 11 illustrates an example user interface 1100 describing user chaining information associated with a selected user account. In the example of FIG. 11, the reviewing user has selected a user account 1102 to review (e.g., "cxh01").

Upon selection, the user interface 1100 updates the number of remote users, the number of target users (e.g., the number of non-unique target user accounts transitioned to), and the number of target network accessible systems (e.g., described above in FIG. 10), and includes information solely associated with the selected user account 1012.

The reviewing user can utilize the user interface 1102 to determine that a malicious actor is controlling the selected user account 1102. For instance, the selected user account 1102 transitioned to nine user accounts, with each transition identified as a "Privileged Non Match", indicating the selected user account 1102 is not associated with the same employee as the transitioned privileged user accounts. Furthermore, the reviewing user can identify that a particular network accessible system accessed by (e.g., transitioned to by) a privileged user account is a particularly important network accessible system. For instance, as illustrated, the highlighted network accessible system 1104 is a domain controller, which is a system that responds to, and handles, security authorization requests for user accounts.

Figure 12:
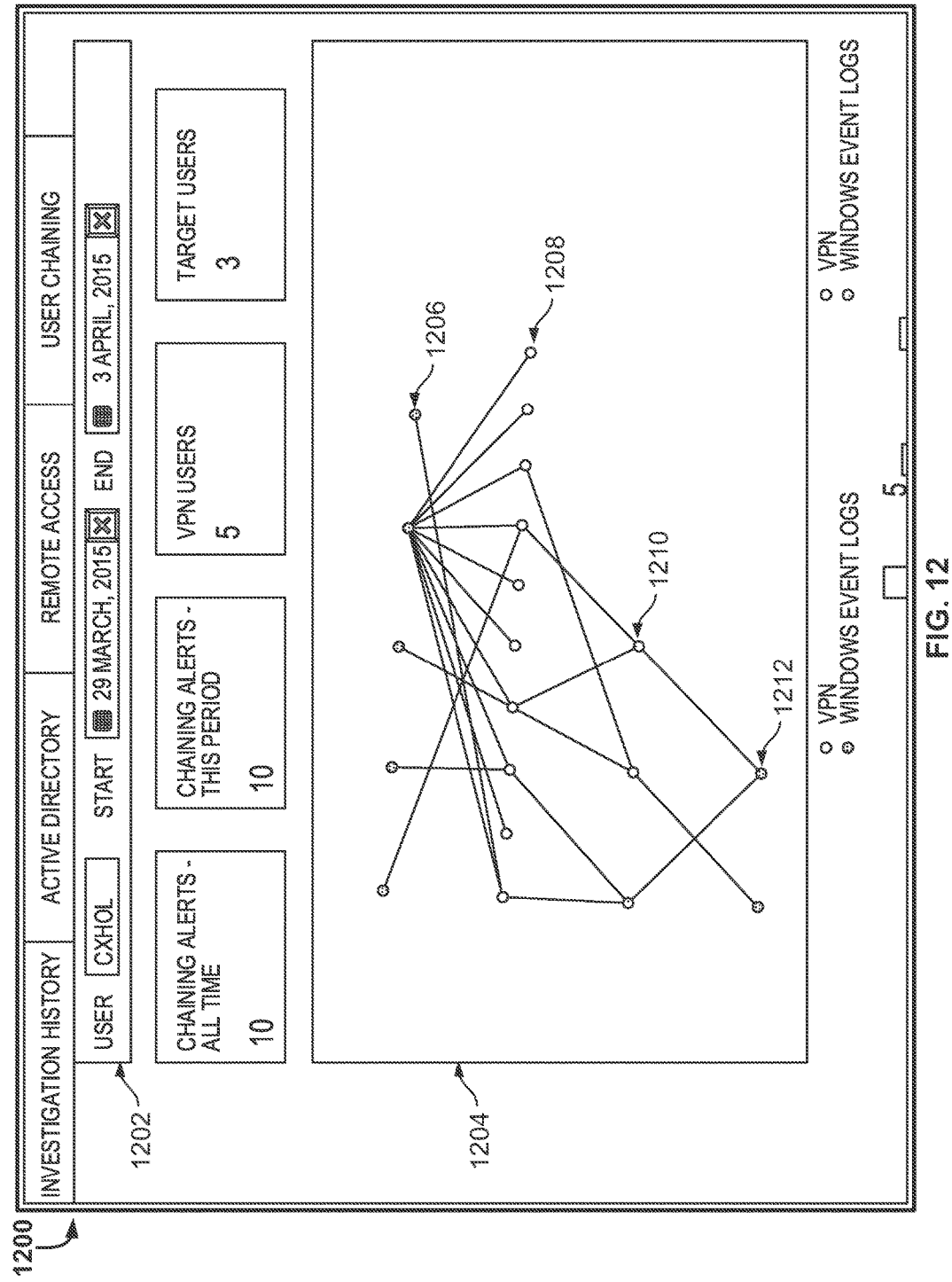
FIG. 12 illustrates an example user interface that includes detailed user chaining information associated with a selected user account.

FIG. 12 illustrates an example user interface 1200 that includes detailed user chaining information associated with a selected user account 1202. The user interface 1200 can be presented upon selection of the user account 1102 described in FIG. 11.

The user interface 1200 includes a number of determined user chaining alerts for all time (e.g., generated based off the user chaining score described in FIG. 4), a number of user chaining alerts for the selected time period, a number of remote access sessions initiated by different virtual private network (VPN) sessions, and a number of unique target users transitioned to by the selected user account 1202.

To help the reviewing user visualize user chaining of the selected user account 1202, the system can generate a connected graph 1204 that illustrates the transitions between user accounts. For instance, the first row 1206 of the connected graph 1204 illustrates unique VPN connections (e.g., 5 VPN connections) that accessed the selected user account 1202. The second row 1208 illustrates user accounts that were transitioned to from the selected user account 1202. Similarly, the third row 1210 illustrates user accounts transitioned to from the second row 1208 of user accounts, and the fourth 1212 row illustrates user accounts transitioned to from the third row 1210.

As described above, with reference to FIG. 4, the system can monitor user accounts transitioned to from a particular user account by monitoring IP addresses, and system logs (e.g., operating system logs) associated with each user account transition. For instance, the first row 1206 identifies initial VPN connections to the selected user account 1202. The system can monitor the network accessible systems accessed by the initial VPN connection, and then upon a transition, the system can obtain system logs and determine an IP address associated with the VPN connection that accessed a different user account and network accessible system. In this way, the system can follow user behavior across multiple user accounts, and provide the connected graph 1204 to explain the transitions to a reviewing user.

As an example of determining user transitions, when a user comes onto the network remotely they are assigned a unique IP. The system can then look for logons on different machines that have a network logon originating from the unique IP assigned above during the time of the user's session. If the user account being used on the different machine differs from the user remotely accessing the network, then that is the behavior we are describing.

Additionally, as described above (e.g., in FIG. 3), the system can identify particular user accounts for review based on user compromise scores. In some implementations, the system can actively monitor and determine user compromise scores, and upon determining that one or more of the user compromise scores for a particular user account exceed a threshold, can trigger notifications to be provided to a user device for review. That is, the user device can execute an application in communication with the system (e.g., a specific application associated with user account monitoring), and the system can trigger the user device to present information describing the particular user account. Additional notifications can include e-mails, SMS, MMS, texts, phone call, and so on. In this way, the system can ensure that time-sensitive information associated with user accounts timely reaches an intended user (e.g., by activating an associated user device).

Each of the processes, methods, and algorithms described in the preceding sections may be embodied in, and fully or partially automated by, code modules executed by one or more computer systems or computer processors comprising computer hardware. The code modules (or "engines") may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wirelessbased and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

In general, the terms "engine" and "module", as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the user account compromise system 100, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage. Electronic Data Sources can include databases, volatile/non-volatile memory, and any memory system or subsystem that maintains information.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A computerized method performed by one or more computer systems, the method comprising:
   accessing network access logs associated with a plurality of network accessible systems, the network access logs being generated in response to network actions associated with a plurality of user accounts, the user accounts each associated with, in the network access logs, one or more IP addresses of corresponding user devices;

determining, based at least on the network access logs, information indicative of user accounts exhibiting high-risk behavior, the information including, for each of one or more user accounts, a transition from the user account to a subsequent user account associated with a different user, the transition being associated with escalated user privileges, wherein the user account transitions are determined based, at least in part, on monitoring IP addresses indicated in the network access logs; and providing, for presentation in an interactive user interface, information describing a set of user accounts and corresponding determined information, wherein the interactive user interface is configured to receive user actions associated with preventing an attack on one or more networks, wherein the user actions comprise one or more of selecting specific user accounts for more detailed information or generating information to be presented to specific user accounts.

2. The computerized method of claim 1, wherein the determined information indicative of a particular user account exhibiting high-risk behavior comprises one or more of information indicating network accessible systems not normally used by the particular user account to access the one or more networks, likelihoods associated with a single user being able to access the particular user account from different locations within threshold periods of times, information associated with traversing the network accessible systems, or information indicating risks and/or abnormalities associated with geographic locations from which the particular user account was used.

3. The computerized method of claim 2, wherein determining information indicative of the particular user account exhibiting high-risk behavior is based, at least in part, on historical user behavior of the particular user account.

4. The computerized method of claim 1, wherein the network access logs comprise virtual private network (VPN) logs, Active Directory (AD) logs, firewall logs, user account access records, system logs, and wherein the network accessible systems comprise server systems, domain controllers, computers, laptops, checkout systems, point of sale systems, firewalls, VPN servers.

5. The computerized method of claim 1, further comprising:

receiving, from a user device presenting the interactive user interface, a request to receive information specific to a particular user account of the set of user accounts, the request identifying a particular time period;

obtaining data describing network actions of the particular user account during the particular time period; and determining updated information indicative of the particular user account exhibiting high-risk behavior, thereby enabling comparisons based on time period.

6. The computerized method of claim 1, wherein the interactive user interface:

presents summary information associated with the set of user accounts, the summary information:

identifying transitions initiating from user accounts of the set of user accounts to respective subsequent user accounts, and identifying whether each transition is associated with escalated user privileged; and enables user actions associated with preventing an attack.

7. The computerized method of claim 6, wherein the interactive user interface presents information identifying that a first user account and a subsequent user account identified by a particular transition are user accounts of a same user.

8. The computerized method of claim 6, further comprising:

receiving, from a user device presenting the interactive user interface, a selection of a particular user account of the set of user accounts; and updating the interactive user interface, such that the interactive user interface presents a visual representation of a graph illustrating transitions from (1) particular user account to subsequent user accounts, and/or (2) transitions from the subsequent user accounts to additional subsequent user accounts.

9. The computerized method of claim 1, further comprising:

causing activation of an application executing on a particular user device, the application being triggered to present information describing the set of user accounts, such that time-sensitive information is presented to a user of the particular user device.

10. A system comprising one or more computer systems and one or more computer storage media storing instructions that when executed by the one or more computer systems cause the one or more computer systems to perform operations comprising:

accessing network access logs associated with a plurality of network accessible systems, the network access logs indicating network actions associated with a plurality of user accounts, the user accounts each associated with, in the network access logs, one or more IP addresses of corresponding user devices;

determining, based at least on the network access logs, information indicative of user accounts exhibiting high-risk behavior, the information including, for each of one or more user accounts, a transition from the user account to a subsequent user account associated with a different user, the transition being associated with escalated user privileges, wherein the user account transitions are determined based, at least in part, on monitoring IP addresses indicated in the network access logs; and providing, for presentation in an interactive user interface, information describing a set of user accounts and corresponding determined information, wherein the interactive user interface is configured to receive user actions associated with preventing an attack on one or more networks, wherein the user actions comprise one or more of selecting specific user accounts for more detailed information or generating information to be presented to specific user accounts.

11. The system of claim 10, wherein the determined information indicative of a particular user account exhibiting high-risk behavior comprises one or more of information indicating network accessible systems not normally used by the particular user account to access the one or more networks, likelihoods associated with a single user being able to access the particular user account from different locations within threshold periods of times, information associated with traversing the network accessible systems, or information indicating risks and/or abnormalities associated with geographic locations from which the particular user account was used.

12. The system of claim 11, wherein determining information indicative of the particular user account exhibiting high-risk behavior is based, at least in part, on historical user behavior of the particular user account.

13. The system of claim 10, wherein the operations further comprise:
receiving, from a user device presenting the interactive user interface, a request to receive information specific to a particular user account of the set of user accounts, the request identifying a particular time period;
obtaining data describing network actions of the particular user account during the particular time period; and
determining updated information indicative of the particular user account exhibiting high-risk behavior, thereby enabling comparisons based on time period.

14. The system of claim 10, wherein the interactive user interface:
presents summary information associated with the set of user accounts, the summary information:
identifying transitions initiating from user accounts of the set of user accounts to respective subsequent user accounts, and
identifying whether each transition is associated with escalated user privileged; and
enables user actions associated with preventing an attack.

15. The system of claim 14, wherein the interactive user interface presents information identifying that a first user account and a subsequent user account identified by a particular transition are user accounts of a same user.

16. The system of claim 15, wherein the operations further comprise:
receiving, from a user device presenting the interactive user interface, a selection of a particular user account of the set of user accounts; and
updating the interactive user interface, such that the interactive user interface presents a visual representation of a graph illustrating transitions from (1) particular user account to subsequent user accounts, and/or (2) transitions from the subsequent user accounts to additional subsequent user accounts.

17. Non-transitory computer storage media storing instructions that when executed one or more computer systems cause the one or more computer systems to perform operations comprising:
accessing network access logs associated with a plurality of network accessible systems, the network access logs indicating network actions associated with a plurality of user accounts, the user accounts each associated with, in the network access logs, one or more IP addresses of corresponding user devices;
determining, based at least on the network access logs, information indicative of user accounts exhibiting high-risk behavior, the information including, for each of one or more user accounts, a transition from the user account to a subsequent user account associated with a different user, the transition being associated with escalated user privileges, wherein the user account transitions are determined based, at least in part, on monitoring IP addresses indicated in the network access logs; and
providing, for presentation in an interactive user interface, information describing a set of user accounts and corresponding determined information, wherein the interactive user interface is configured to receive user actions associated with preventing an attack on one or more networks, wherein the user actions comprise one or more of selecting specific user accounts for more detailed information or generating information to be presented to specific user accounts.

18. The non-transitory computer storage of claim 17, wherein the determined information indicative of a particular user account exhibiting high-risk behavior comprises one or more of information indicating network accessible systems not normally used by the particular user account to access the one or more networks, likelihoods associated with a single user being able to access the particular user account from different locations within threshold periods of times, information associated with traversing the network accessible systems, or information indicating risks and/or abnormalities associated with geographic locations from which the particular user account was used.

19. The non-transitory computer storage of claim 17, wherein the interactive user interface:
presents summary information associated with the set of user accounts, the summary information:
identifying transitions initiating from user accounts of the set of user accounts to respective subsequent user accounts, and
identifying whether each transition is associated with escalated user privileged; and
enables user actions associated with preventing an attack.

20. The non-transitory computer storage of claim 19, wherein the operations further comprise:
receiving, from a user device presenting the interactive user interface, a selection of a particular user account of the set of user accounts; and
updating the interactive user interface, such that the interactive user interface presents a visual representation of a graph illustrating transitions from (1) particular user account to subsequent user accounts, and/or (2) transitions from the subsequent user accounts to additional subsequent user accounts.

* * * * *

UNITED STATES PATENT AND TRADEMARK OFFICE
CERTIFICATE OF CORRECTION

PATENT NO. : 10,129,282 B2
APPLICATION NO. : 15/395483
DATED : November 13, 2018
INVENTOR(S) : Samuel Jones Page 1 of 1

It is certified that error appears in the above-identified patent and that said Letters Patent is hereby corrected as shown below:

In the Claims

In Column 27, Line 42, Claim 17, change "one" to --by one--.

Signed and Sealed this
Twelfth Day of March, 2019

Andrei Iancu
*Director of the United States Patent and Trademark Office*